(12) United States Patent
Taylor et al.

(10) Patent No.: US 9,504,919 B2
(45) Date of Patent: Nov. 29, 2016

(54) VERTICAL AND HORIZONTAL PERCEPTION AUDIO FOR A GAMING DEVICE

(71) Applicant: Cadillac Jack, Inc., Duluth, GA (US)

(72) Inventors: Laura Elizabeth Taylor, Atlanta, GA (US); Jason Dean Grace, Lilburn, GA (US); Ian Robert Scott, Duluth, GA (US); Mark Andrew Thompson, Buford, GA (US)

(73) Assignee: Cadillac Jack, Inc., Duluth, GA (US)

( * ) Notice: Subject to any disclaimer, the term of this patent is extended or adjusted under 35 U.S.C. 154(b) by 109 days.

(21) Appl. No.: 13/906,631

(22) Filed: May 31, 2013

(65) Prior Publication Data

US 2014/0357368 A1  Dec. 4, 2014

(51) Int. Cl.

| | |
|---|---|
| *A63F 9/24* | (2006.01) |
| *A63F 13/00* | (2014.01) |
| *G06F 17/00* | (2006.01) |
| *G06F 19/00* | (2011.01) |
| *A63F 13/54* | (2014.01) |
| *A63F 13/90* | (2014.01) |
| *G07F 17/32* | (2006.01) |
| *H04S 3/00* | (2006.01) |

(52) U.S. Cl.
CPC .............. *A63F 13/54* (2014.09); *A63F 13/90* (2014.09); *G07F 17/3204* (2013.01); *H04S 3/00* (2013.01)

(58) Field of Classification Search
USPC ...................... 463/20, 22, 25, 30, 35, 37, 42
See application file for complete search history.

(56) References Cited

U.S. PATENT DOCUMENTS

| | | | | |
|---|---|---|---|---|
| 5,754,660 | A * | 5/1998 | Shimizu ................. | A63F 13/02 381/17 |
| 5,850,455 | A * | 12/1998 | Arnold .................... | H04S 3/00 381/1 |
| 2003/0100359 | A1* | 5/2003 | Loose et al. .................... | 463/20 |
| 2004/0142747 | A1* | 7/2004 | Pryzby ............................ | 463/35 |
| 2004/0142748 | A1* | 7/2004 | Loose et al. ................... | 463/35 |
| 2004/0147316 | A1* | 7/2004 | Nagano .................. | A63F 13/08 463/35 |
| 2008/0070685 | A1* | 3/2008 | Pryzby et al. .................. | 463/35 |
| 2011/0300950 | A1* | 12/2011 | Noda .................. | G07F 17/3216 463/46 |

\* cited by examiner

*Primary Examiner* — Adetokunbo O Torimiro

(74) *Attorney, Agent, or Firm* — Weide & Miller, Ltd.

(57) ABSTRACT

Examples disclosed herein relate to an electronic gaming device including one or more processors, a memory, and one or more display devices. The electronic gaming device further includes a left surround audio device, a right surround audio device, a dialog enhancing center channel speaker, a low frequency effects device, a left speaker, and a right speaker. The combination of the left surround audio device; the right surround audio device; the dialog enhancing center channel speaker; the low frequency effects device; the left speaker; and/or the right speaker produce one or more sound effects in a vertical direction.

20 Claims, 23 Drawing Sheets

VERTICAL AND HORIZONTAL PERCEPTION AUDIO FOR A GAMING DEVICE

FIELD

The subject matter disclosed herein relates to an electronic gaming device. More specifically, the disclosure relates to one or more vertically-oriented sound devices for the electronic gaming device.

INFORMATION

The gaming industry has numerous casinos located both worldwide and in the United States. A client of a casino or other gaming entity can gamble via various games of chance. For example, craps, roulette, baccarat, blackjack, and electronic games (e.g., a slot machine) where a person may gamble on an outcome.

Paylines of an electronic gaming device (e.g., a slot machine) are utilized to determine when predetermined winning symbol combinations are aligned in a predetermined pattern to form a winning combination. A winning event occurs when the player successfully matches the predetermined winning symbols in one of the predetermined patterns.

A player's entertainment while playing one or more games may be enhanced by utilizing one or more vertically-oriented sound devices on the electronic gaming device. By increasing the player's entertainment level, the player's enjoyment of the game may be enhanced, which may increase a player's game playing period.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
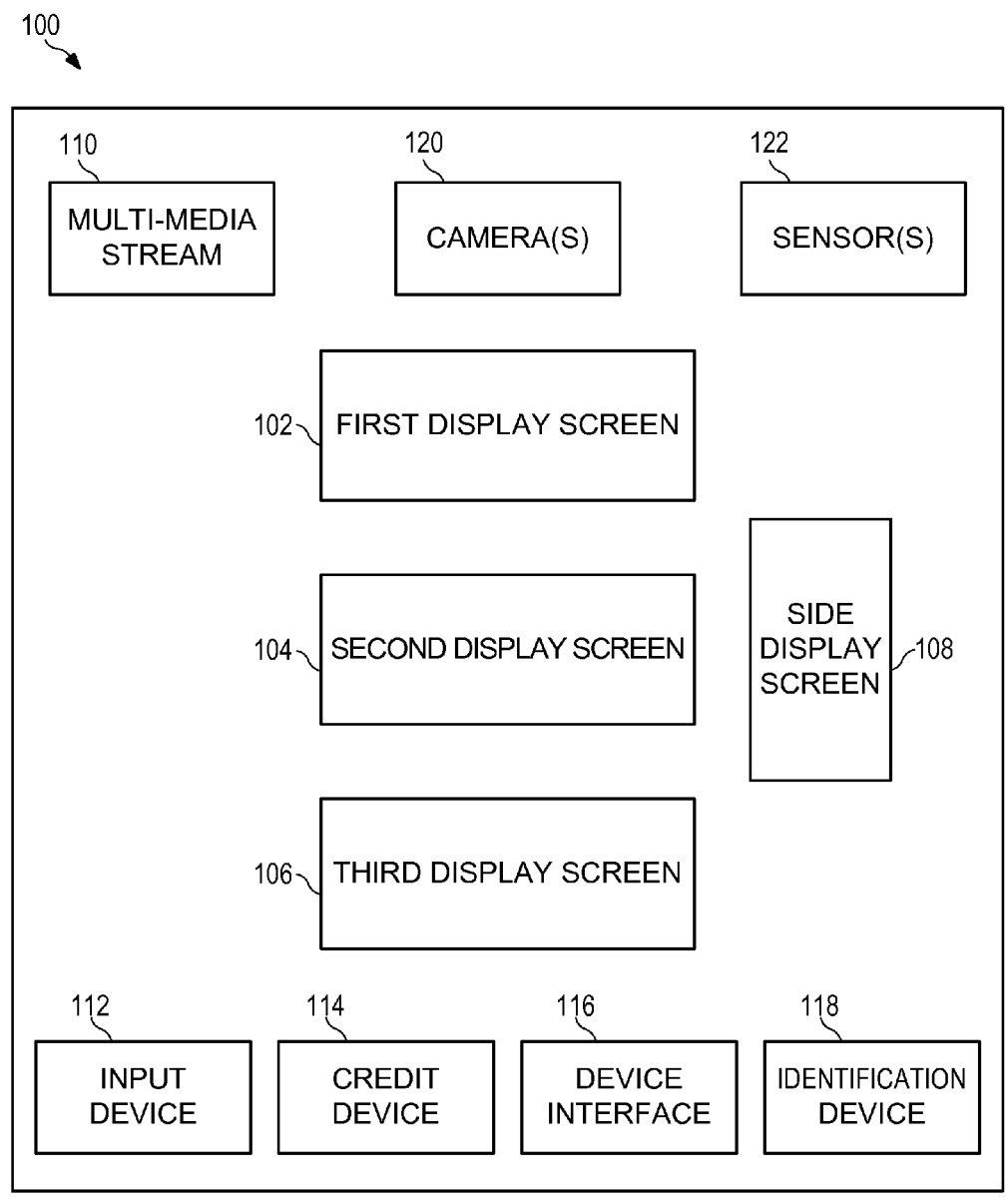
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for a casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to verify one or more parameters relating to one or more audio devices, one or more display devices, one or more electrical wires, one or more springs, one or more motors, one or more adjustable devices, and/or one or more sensors, to unlock one or more audio devices, one or more display devices, one or more electrical wires, one or more springs, one or more motors, one or more adjustable devices, and/or one or more sensors, to make a wager, to control any object, to select one or more pattern gaming options, to obtain data relating to historical payouts, to select a row and/or column to move, to select a row area to move, to select a column area to move, to select a symbol (or image) to move, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), and/or any combination thereof. These selections may occur via any other input device (e.g., a touch screen, voice commands, etc.). Input device 112 may be any control panel.

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more game functionalities (e.g., game type 1, game type 2, game type 3, etc.) may be presented, a repeat payline gaming option may be presented, a pattern gaming option may be presented, historical gaming data may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, the player may only want to play games that include pattern gaming options only. Therefore, only games which include pattern gaming options would be presented to the player. In another example, the player may only want to play games that include historical information relating to game play. Therefore, only games which include historical gaming data would be presented to the player. These examples may be combined.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, to display one or more warnings relating to one or more audio devices, one or more display devices, one or more electrical wires, one or more springs, one or more motors, one or more adjustable devices, and/or one or more sensors, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

For example, a single large image could be partially displayed on second display screen 104 and partially displayed on third display screen 106, so that when both display screens are put together they complete one image. Electronic gaming device 100 may stream or play prerecorded multi-media data, which may be displayed on any display combination.

One or more cameras 120 and/or one or more sensors 122 may be utilized as one or more depth image sensing devices, which may be located in various locations, including but not limited to, above the base display, above second display, in one or more locations on gaming cabinet front, on a side of the gaming cabinet other than gaming cabinet front, and/or any other location.

In one embodiment, electronic gaming device 100 may not include separate one or more input devices, but instead may only utilize one or more depth image sensing devices. In another embodiment, a player may utilize one or more input devices and/or may utilize gestures that electronic gaming device 100, via one or more depth image sensing devices, recognizes in order to make inputs for a play of a game. A player may interact with electronic gaming device 100 via one or more depth image sensing devices for a plurality of various player inputs.

In one embodiment, one or more depth image sensing devices may include at least two similar devices. For example, each of the at least two similar devices may independently sense depth and/or image of a scene. In another example, such similar depth image sensing devices may then communicate information to one or more processors, which may utilize the information from each of the similar depth image sensing devices to determine the relative depth of an image from a captured scene.

In another embodiment, one or more depth image sensing devices may include at least two different devices. For example, and discussed in more detail below, one of the at least two different devices may be an active device and/or one of the at least two different devices may be a passive device. In one example, such an active device may generate a wave of measurable energy (e.g., light, radio, etc.). In another example, such a passive device may be able to detect reflected waves generated by such an active device. In another example, such an active device and such a passive device may each communicate data related to their respective activity to a processor, and such processor may translate such data in order to determine the depth and/or image of a scene occurring near electronic gaming device 100.

Electronic gaming device 100 may include at least one display device. Electronic gaming device 100 may include a base display and/or a second display. In one embodiment, base display may be the primary display for a first game. In another embodiment, second display may be the primary display for a second and/or bonus game. For example, base display may display a reel-type video slot game, and upon a triggering condition, second display may display a bonus game.

In one embodiment, base display and second display may display separate portions of a common image. For example, second display may display a top portion of a wheel spinning while base display may display the bottom portion of the same wheel spinning.

Electronic gaming device 100 may also include one or more speakers. In one embodiment, one or more speakers may work in a synchronized manner to provide a surround sound effect. For example, as an object is displayed moving across base display from left to right, one or more speakers may produce sound in such a manner as to create an audible sense of similar left to right movement. In another embodiment, one or more speakers may work asynchronously. In a further embodiment, a first speaker may produce sounds associated with a first symbol appearing in a play of a game, and a second speaker may produce sounds associated with a second symbol appearing in a play of the game.

Figure 2:
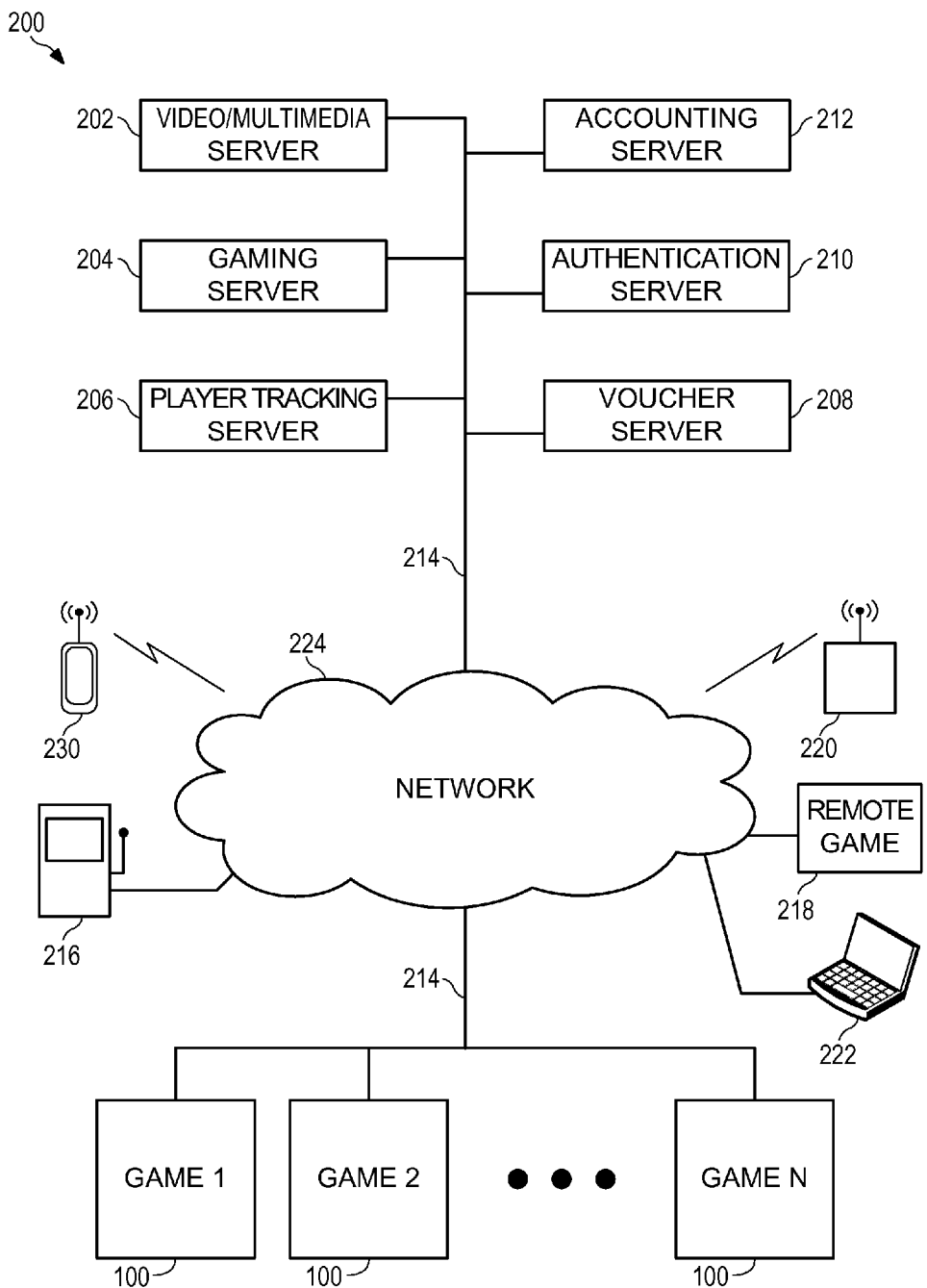
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, and an accounting server 212.

Electronic gaming system 200 may include video/multimedia server 202, which may be coupled to network 224 via a network link 214. Network 224 may be the Internet, a private network, and/or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes. Gaming server 204 may provide one or more of a payout functionality, a game play functionality, a game play evaluation functionality, other game functionality, and/or any other virtual game functionality.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include game play data (or similar game play data), repeat payline data, pattern data, historical payout data, column data, row data, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components, such as network interface cards, repeaters and hubs, bridges, switches, routers, firewalls, or any combination thereof may also be part of network 224.

A statistics server may be used to maintain data relating to historical game play for one or more electronic gaming devices 100. This historical data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Figure 3:
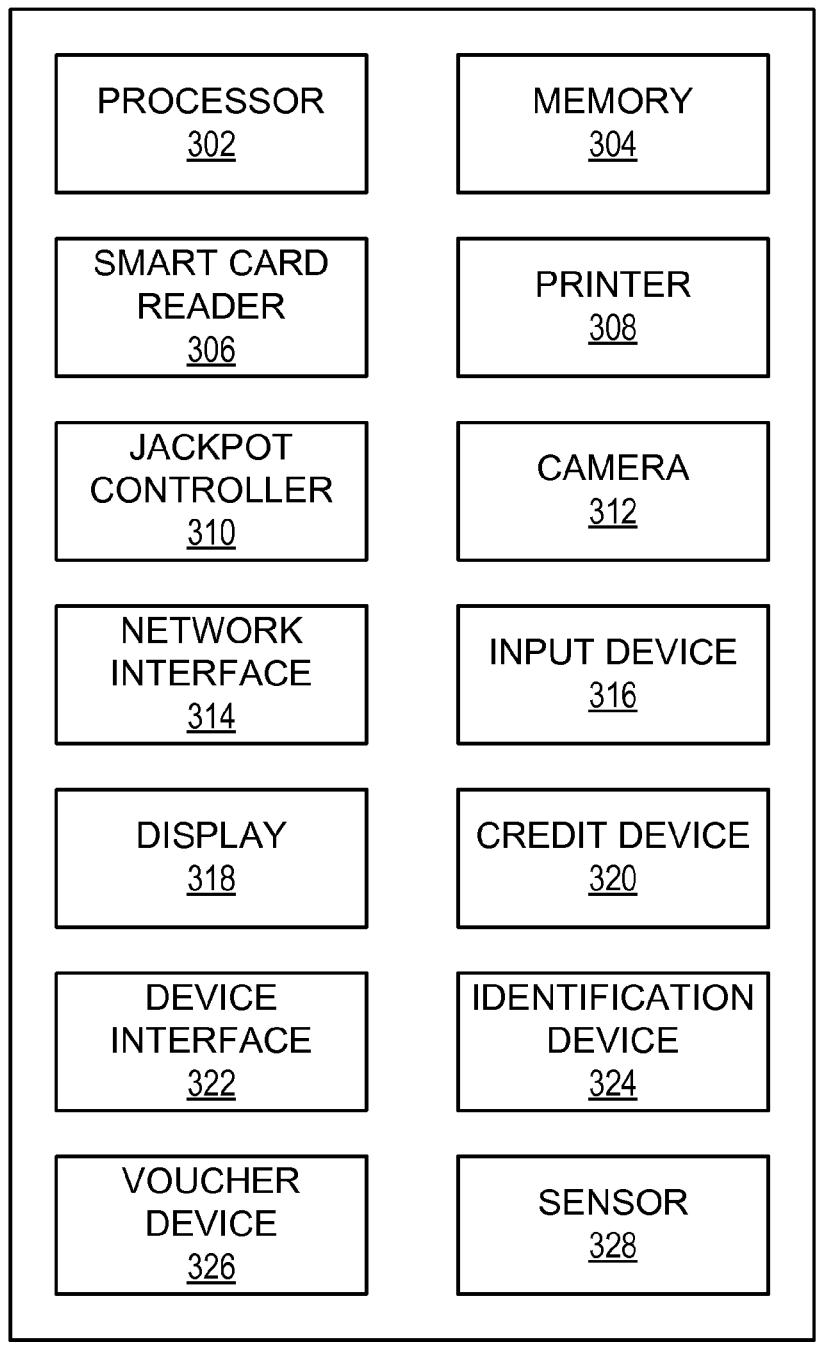
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., and/or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include his or her image into the game play. A picture of a player may be an actual image as taken by camera 312. A picture of a player may be a computerized caricature of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes. For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, and/or accounting server 212.

Input device 316 may be mechanical buttons, electronic buttons, a touch screen, and/or any combination thereof. Input device 316 may be utilized to make a wager, to select one or more game elements, to select one or more gaming options, to make an offer to buy or sell a voucher, to determine a voucher's worth, to cash in a voucher, to modify electronic gaming device 100 (e.g., change sound level, configuration, font, language, etc.), to modify one of one or more audio devices, one or more display devices, one or more electrical wires, one or more springs, one or more motors, one or more adjustable devices, and/or one or more sensors, to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with his or her mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

Figure 4:
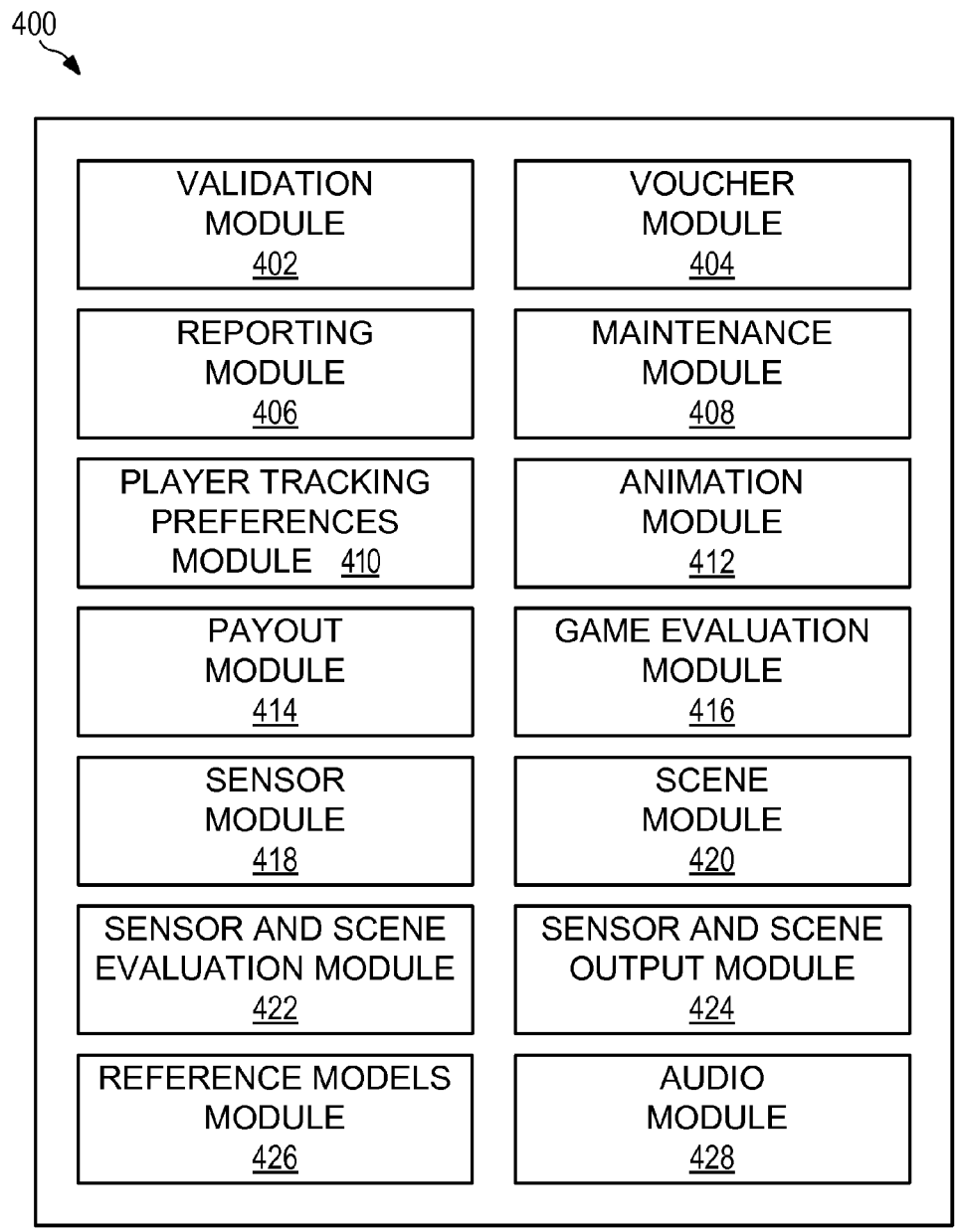
FIG. 4 is another block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, an animation module 412, a payout module 414, a game evaluation module 416, a sensor module 418, a scene module 420, a sensor and scene evaluation module 422, a sensor and scene output module 424, a reference models module 426, an audio module 428, an audio device adjustment module 430, a display device adjustment module 432, and a bonus module 434.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Animation module 412 may generate, compile, transmit, and/or store one or more animations and/or presentations based on one or more scene data, one or more scenes, one or more reference models, one or more game play data, one or more player profiles, and/or any combination thereof.

Payout module 414 may determine one or more payouts which may relate to one or more inputs received from the player, electronic gaming device 100, and/or electronic gaming system 200.

Game evaluation module 416 may evaluate one or more outcomes for one or more events relating to game play.

Sensor module 418 may generate, compile, transmit, and/or store any data relating to one or more scene data, one or more scene, and/or any other sensor data. This data may include one or more gestures (e.g., body movement made by one or more players).

Scene module 420 may generate, compile, transmit, and/or store on one or more scene data, one or more scenes, one or more reference models, one or more game play data, one or more player profiles, and/or any combination thereof.

Sensor and scene evaluation module 422 may evaluate any data stored on, transmitted to, and/or transmitted from sensor module 418 and scene module 420. Sensor and scene evaluation module 422 may obtain data including one or more gestures (e.g., body movement made by one or more players) from sensor module 418 and compare this data to one or more body reference models, body part reference models, device reference models, gaming device reference models, floor plan reference models, and/or any other reference models from reference models module 426 to determine one or more actions.

Sensor and scene output module 424 may evaluate the combined output of sensor module 418 and scene module 420.

Reference models module 426 may generate, compile, transmit, and/or store one or more body reference models, body part reference models, device reference models, gaming device reference models, floor plan reference models, and/or any other reference models which can be utilized by any of the other modules.

Audio module 428 may generate, compile, transmit, and/or store one or more audio structures, sound wave configurations, and/or any other audio data.

Audio device adjustment module 430 may adjust one or more audio devices. These devices may be adjusted physically (e.g., moved) and/or by changing one or more device characteristics.

Display device adjustment module 432 may adjust one or more display devices. These devices may be adjusted physically (e.g., moved) and/or by changing one or more device characteristics.

Bonus module 434 may generate a bonus game, evaluate the results of the bonus game, trigger bonus game presentations, generate bonus game payouts, and/or display any data relating to the bonus game.

Installation verification module may verify the installation parameters on one or more audio devices, one or more display devices, one or more electrical wires, one or more springs, one or more motors, one or more adjustable devices, and/or one or more sensors to one or more reference data points. Installation verification module may generate a warning when the data points are outside of a specific parameter range. One or more warnings may be transmitted to an external device, a server, a mobile device, and/or a warning display on electronic gaming device 100 based on the verification data.

Locking module may control the locking mechanism for one or more audio devices, one or more display devices, one or more electrical wires, one or more springs, one or more motors, one or more adjustable devices, and/or one or more sensors. Locking module may control any locking mechanism for electronic gaming device 100. Locking module may generate a warning when a locking data point is outside of a specific parameter. These warnings may be transmitted to an external device, a server, a mobile device, and/or a warning display on electronic gaming device 100.

It should be noted that one or more modules may be combined into one module. Further, there may be one evaluation module where the determined payout does not depend on whether there were any wild symbols, scatter symbols, platform based game play, and/or any other specific symbols. Further, any module, device, and/or logic function in electronic gaming device 100 may be present in electronic gaming system 200. In addition, any module, device, and/or logic function in electronic gaming system 200 may be present in electronic gaming device 100.

Figure 5A:
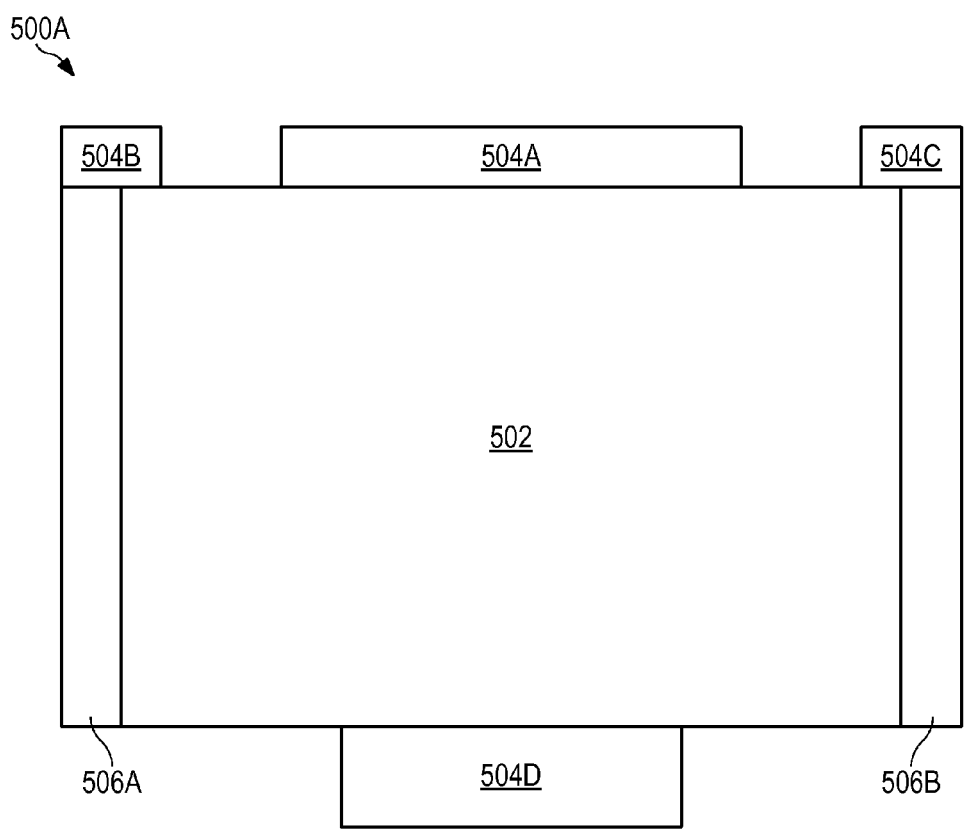
FIGS. 5A-5C are illustrations of one or more vertically-oriented sound devices on a gaming device, according to various embodiments.

In FIG. 5A, one or more vertically-oriented sound devices on a gaming device 500A is shown, according to one embodiment. In one example, the one or more vertically-oriented sound devices 500A may include a first stereo imaging audio device 504B and a second stereo imaging audio device 504C. In another example, first stereo imaging audio device 504B and second stereo imaging audio device 504C may include one or more enhanced basses. In another example, the one or more vertically-oriented sound devices 500A may include a dialog enhancing center channel speaker 504A. In one example, one or more vertically-oriented sound devices 500A may include a first vertically-oriented stereo speaker bar 506A and a second vertically-oriented stereo speaker bar 506B. In a further example, one or more vertically-oriented sound devices 500A may include a third imaging audio device 504D, which may be a subwoofer device. In one example, the system and/or method may be a sound system with a bass boosting device, a dialog enhancement device, and a vertical perception device.

Figure 17:
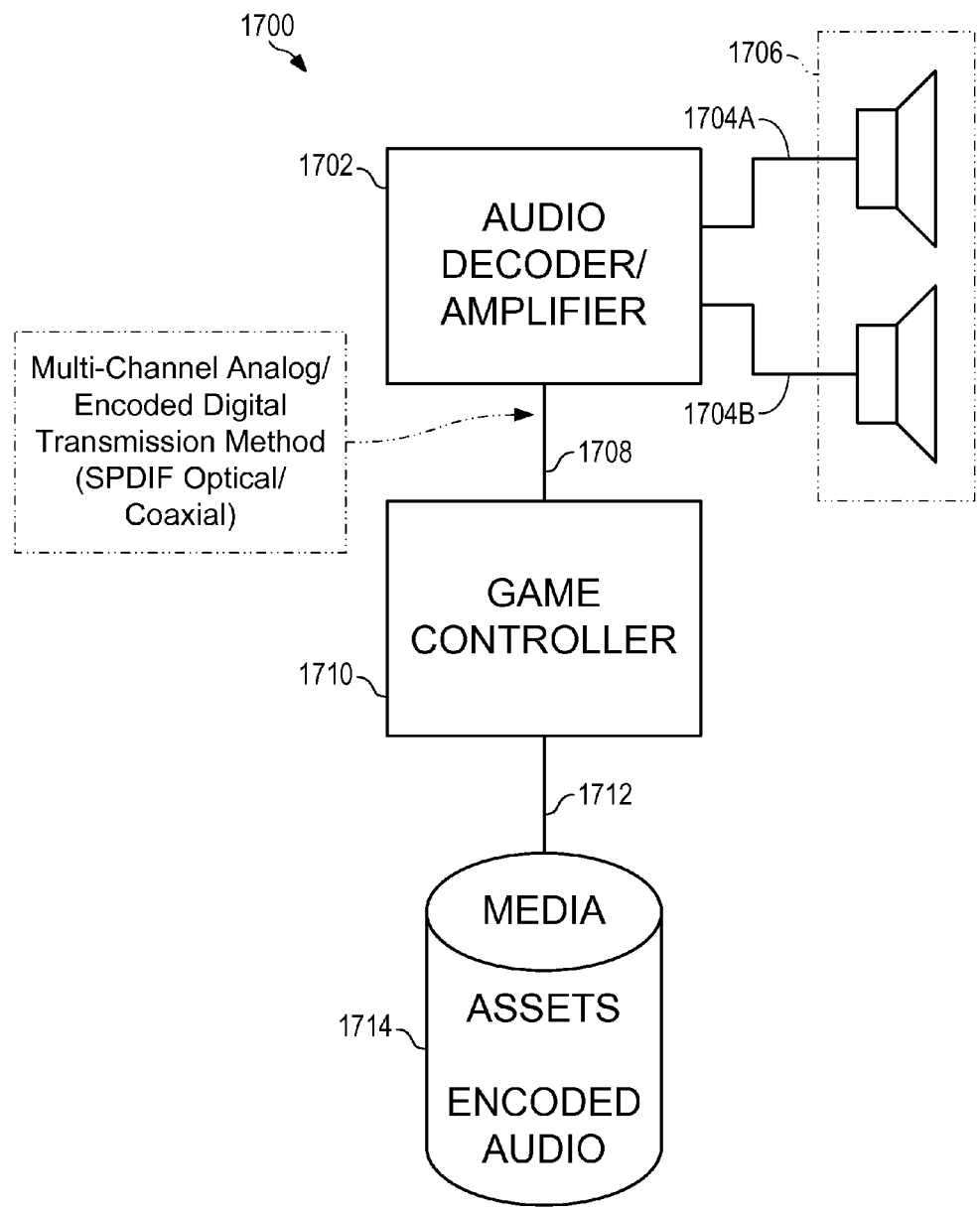
FIG. 17 is an illustration of an audio system, according to one embodiment.

In one example, the set-up may include the stereo speakers on top of electronic gaming device 100, the subwoofer, and sound bars along the sides, and/or a pair of speakers on each side. In one example, the sound may be routed to each speaker set via three or more discrete stereo signals (See FIG. 6). In one example, this may be modified to an encoded surround signal. In these examples, the routing audio (e.g., multi-channel analog, and/or encoded digital transmission method, etc.) may be utilized to transmit the audio to one or more speakers. In one example, six speakers placed at various places described in this disclosure, plus a subwoofer, may be utilized to provide sound. In one example, the left speaker and/or the right speaker may be on the bottom as the two bottom speakers, a center channel (e.g., mono/dialogue) set of speakers placed where the two monitors meet, the left surround speaker and/or the right surround speaker may be on the top of the top monitor, and a subwoofer inside the cabinet. In another example, the system and/or method may provide the game player with a unique, immersive sound experience while creating the optimal sound environment within the physical parameters of the cabinet. In one example, the placement of the left surround speaker and/or the right surround speaker at the top of the cabinet and the center channel in the middle allows for the movement of sound along the Y-Plane, in addition to the stereo sound moving across the X-Plane. In addition, sound may also move across the X-Plane in the left surround speaker and/or the right surround speaker, and the center face. In one example shown in FIG. 17, an audio system 1700 may include an audio decoder/amplifier 1702, one or more speakers 1706 which may communicate via one or more communication links (e.g., 1704A, 1704B, etc.), game controller 1710 which may communicate via a multi-channel analog/encoded digital transmission method 1708 (e.g., SPDIF Optical Coaxial), and one or more media assets 1714 (e.g., encoded audio).

In another example, the system and/method may optimize the sound and player experience in the cabinet. In one example, the system and/method may provide sound in mono, stereo, and/or true surround sound. In another example, the system and/or method may move sound along the Y-Plane. In an example, the system and/or method may provide unique opportunities for game play via vertical and/or diagonal sounds. In one example, the system and/or method may enhance the dialog and/or music and/or sound effects via the center channel speaker(s). In one example, the system and/or method may enhance the dialog and/or SFX via the center channel speaker(s). In another example, the system and/or method may move sound vertically and/or diagonally across and/or multi-directionally along the face of the cabinet. In one example, the system and/or method may use stereo speakers mounted at a 90 degree angle. In one example, the system and/or method may use multiple stereo signals to get audio to the several sets of speakers (See FIG. 6). In another example, the system and/or method may utilize encoded/decoded surround signals to get the audio to the several sets of speakers. In one example, the system and/or method may utilize the speakers mounted on the top of the top display screen that do not mirror the other speaker's output.

Figure 5B:
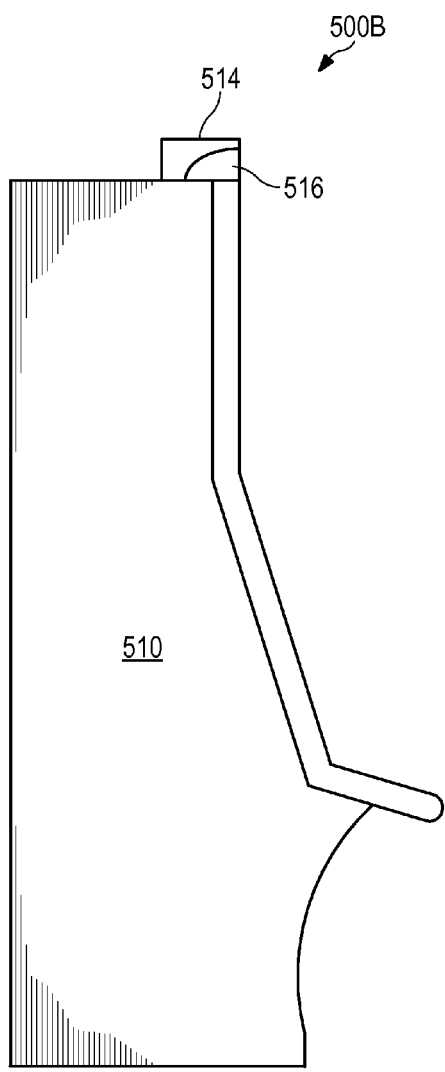

In FIG. 5B, one or more vertically-oriented sound devices on a gaming device 500B is shown, according to one embodiment. In this example, one or more speakers 516 may be located at the top of a gaming device 510 and next to a dialog enhancing center channel speaker 514.

Figure 5C:
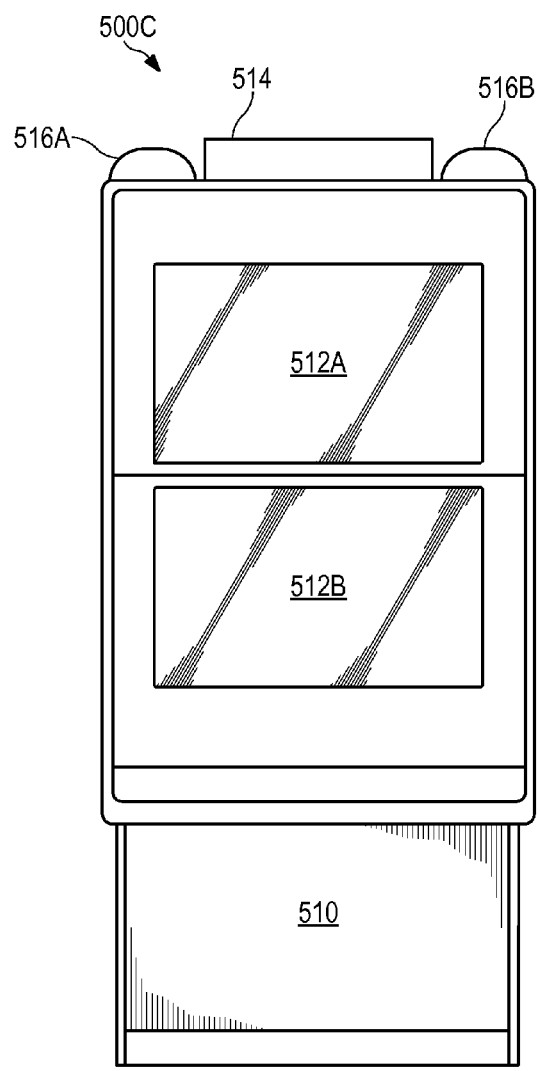

In FIG. 5C, one or more vertically-oriented sound devices on a gaming device 500C is shown, according to one embodiment. In this example, gaming device 510 may include a first display screen 512A and a second display screen 512B. Gaming device 510 may include a first stereo imaging audio device 516A, a second stereo imaging audio device 516B, and dialog enhancing center channel speaker 514.

Figure 6:
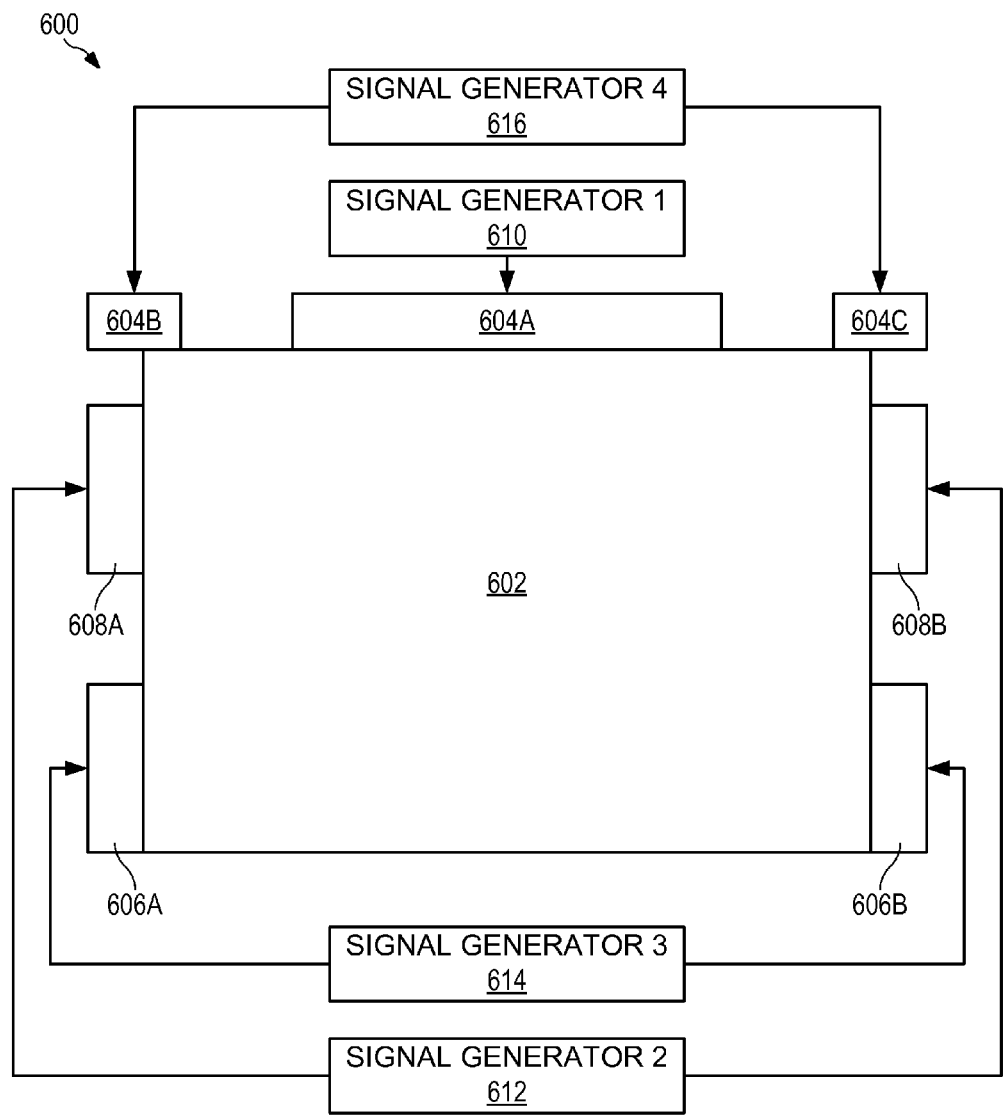
FIG. 6 is an illustration of the one or more vertically-oriented sound devices in the electronic gaming machine, according to one embodiment.

In FIG. 6, an illustration of the one or more vertically-oriented sound devices in the electronic gaming machine 600 is shown, according to one embodiment. In this example, a gaming cabinet 602 may include a first stereo imaging audio device 604B, a second stereo imaging audio device 604C, a dialog enhancing center channel speaker 604A, a first subwoofer 608A, a second subwoofer 608B, a first sound bar 606A, and a second sound bar 606B. In one example, a first signal generator 610, a second signal generator 612, a third signal generator 614, and a fourth signal generator 616 may be located inside of gaming cabinet 602. In another example, first signal generator 610, second signal generator 612, third signal generator 614, and fourth signal generator 616 may be located outside of gaming cabinet 602. In one example, first signal generator 610 may transmit one or more signals to dialog enhancing center channel speaker 604A to produce one or more audio sounds. In another example, second signal generator 612 may transmit one or more signals to first subwoofer 608A and/or second subwoofer 608B to produce one or more audio sounds. In another example, third signal generator 614 may transmit one or more signals to first sound bar 606A and/or second sound bar 606B to produce one or more audio sounds. In another example, fourth signal generator 616 may transmit one or more signals to first stereo imaging audio device 604B and/or second stereo imaging audio device 604C to produce one or more audio sounds. It should be noted that first signal generator 610, second signal generator 612, third signal generator 614, and/or fourth signal generator 616 may be combined into one signal generator, two signal generators, etc.

Figure 7A:
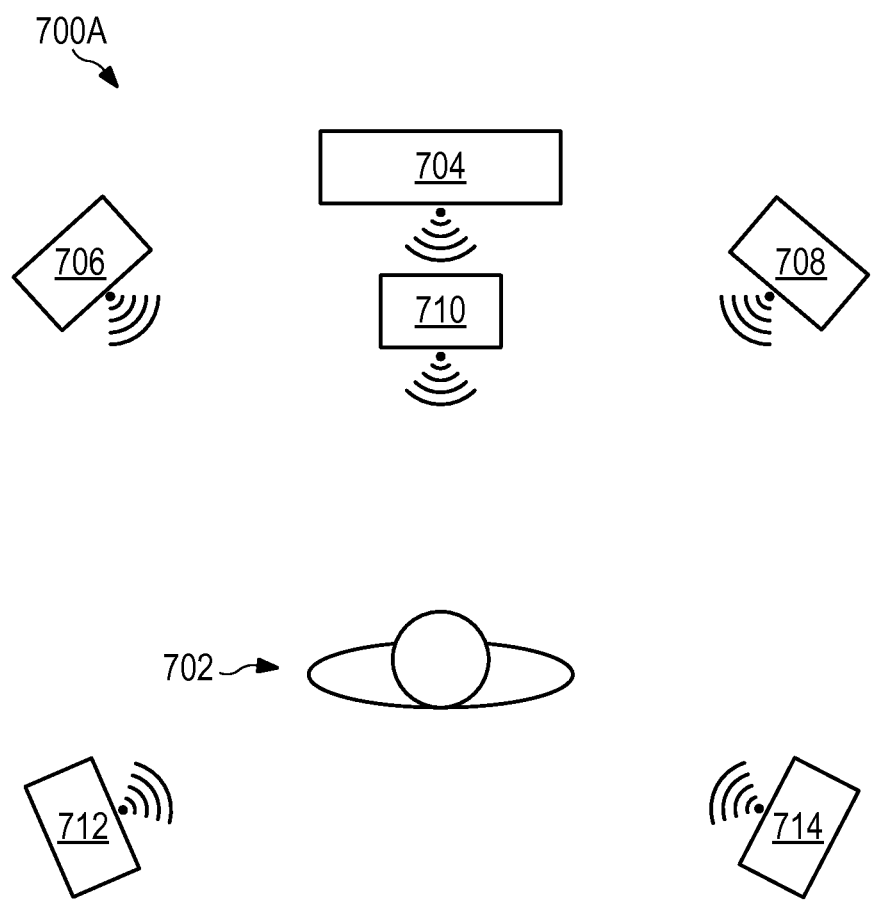
FIG. 7A is an illustration of sound devices, according to one embodiment.

In FIG. 7A, an illustration of sound devices 700A is shown, according to one embodiment. In one example, sound devices 700A may include a left speaker 706, a low frequency effects ("LFE") device 710, a right speaker 708, a center channel device 704, a left surround sound device 712, and a right surround sound device 714, which provide sounds towards a target 702.

Figure 7B:
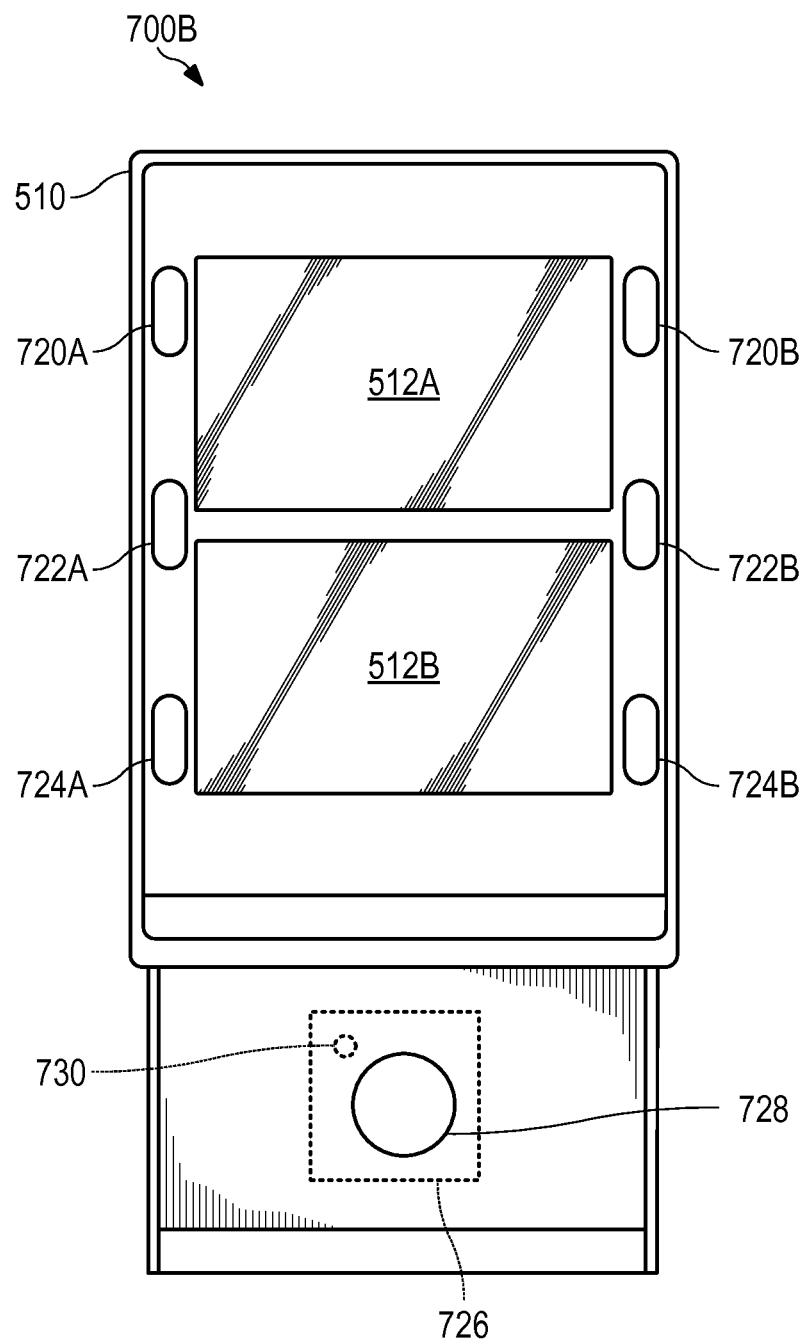
FIG. 7B is an illustration of the one or more vertically-oriented sound devices, according to one embodiment.

In FIG. 7B, an illustration of the one or more vertically-oriented sound devices 700B is shown, according to one embodiment. In this example, gaming device 510 includes first display screen 512A and second display screen 512B. Further, a left surround device 720A corresponds to left surround sound device 712 (See FIG. 7A). A right surround device 720B corresponds to right surround sound device 714 (See FIG. 7A). In addition, a first center channel 722A and a second center channel 722B correspond to center channel device 704 (See FIG. 7A). Further, a left speaker 724A corresponds to left speaker 706 (See FIG. 7A). Right speaker 724B corresponds to right speaker 708 (See FIG. 7A). Furthermore, a low frequency effects device 726 (728 and 730) corresponds to LFE device 710 (See FIG. 7A).

Figure 8:
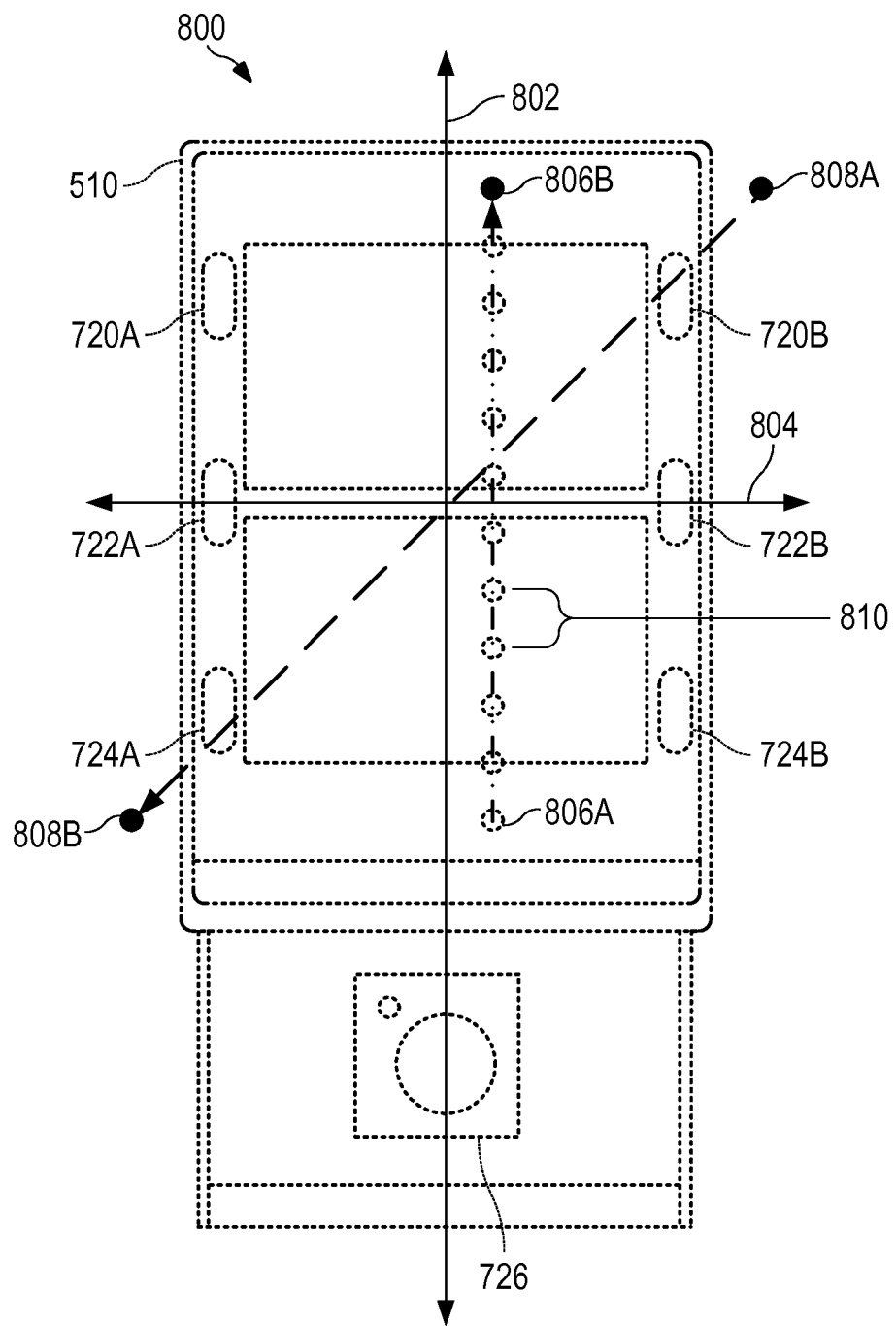
FIG. 8 is an illustration of the one or more vertically-oriented sound devices, according to one embodiment.

In FIG. 8, an illustration of the one or more vertically-oriented sound devices 800 is shown, according to one embodiment. In this example, gaming device 510 may have a Y-Axis 802 and an X-Axis 804 overlaid on top of gaming device 510 for illustrative purposes. In this example, one or more sound features (e.g., sound waves, music, voice, sound effects, etc.) may move forward from a first position 806A in a vertical direction (e.g., along the Y-Axis 802 only) towards a second position 806B, which is illustrated by one or more sound movements 810. In another example, one or more sound features may move from a third position 808A in a vertical direction and diagonal direction (e.g., movement in both the X-Axis 804 and the Y-Axis 802) towards a fourth position 8088.

Figure 9A:
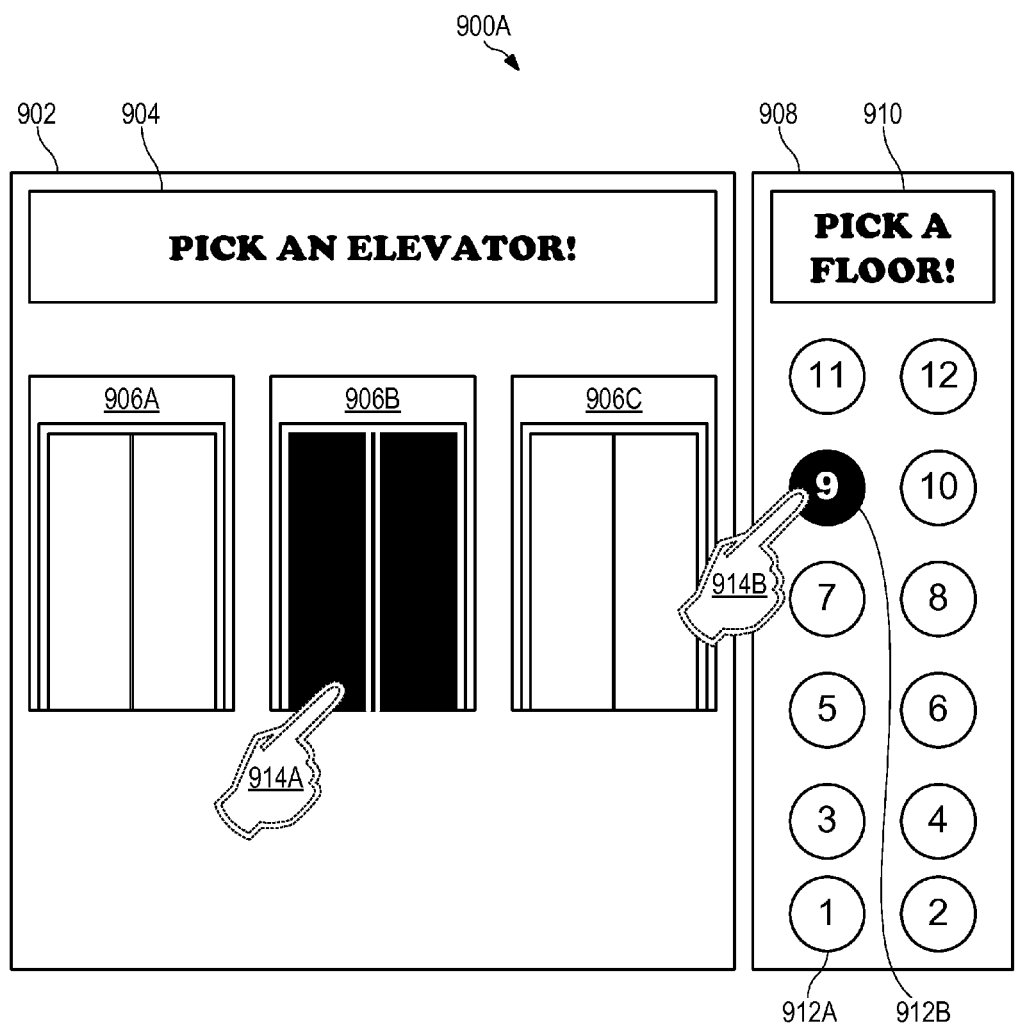
FIGS. 9A-9E are illustrations of the one or more vertically-oriented sound devices, according to various embodiments.

In FIGS. 9A-9E, illustrations of the one or more vertically-oriented sound devices are shown, according to various embodiments. In FIG. 9A, a first image 900A shows a primary display 902 with a first message area 904 and a selection area 906A, 906B, and 906C. First image 900A includes a secondary display 908 with a second message area 910, one or more potential selections 912A, and a selected item 912B (e.g., via a second selection hand 914B). In this example, the player via a first selection hand 914A selects a second elevator option 906B and the player via second selection hand 914B selects a ninth floor (e.g., selected item 912B).

Figure 9B:
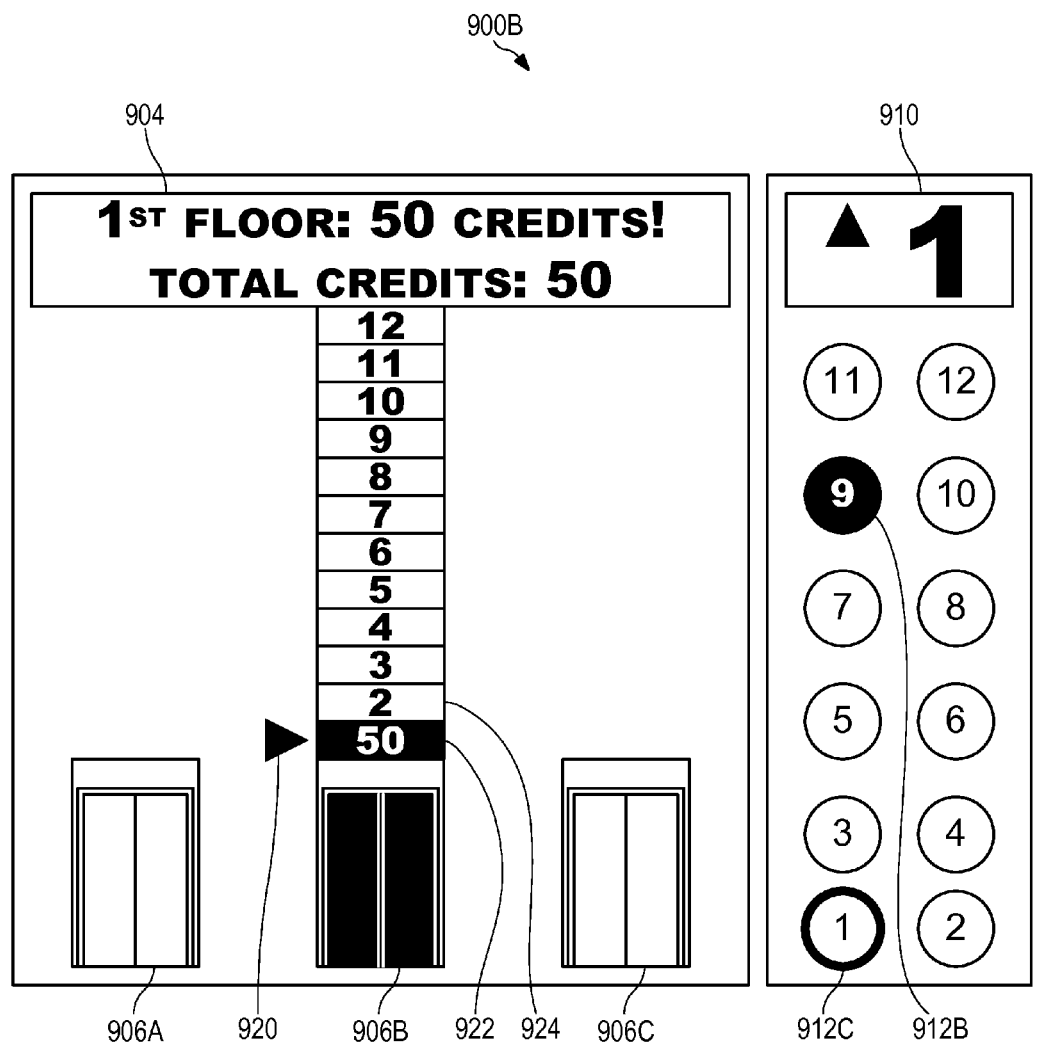

In this example, a second image 900B includes second elevator option 906B expanding to show all of floors (in this example there are 12 floors but any number of floors and/or objects may be utilized) (See FIG. 9B). A first floor 922 may reveal a prize amount (e.g., 50 credits) with a first message of the "$1^{st}$ Floor: 50 Credits! Total Credits: 50." The system and/or method may indicate via a pointer 920, by highlighting 912C, and/or by providing a message in first message area 904 and/or second message area 910 the floor number, which floor the game play is presently on. Further, a second floor 924 and/or any other floor and/or object may be indicated.

Figure 9C:
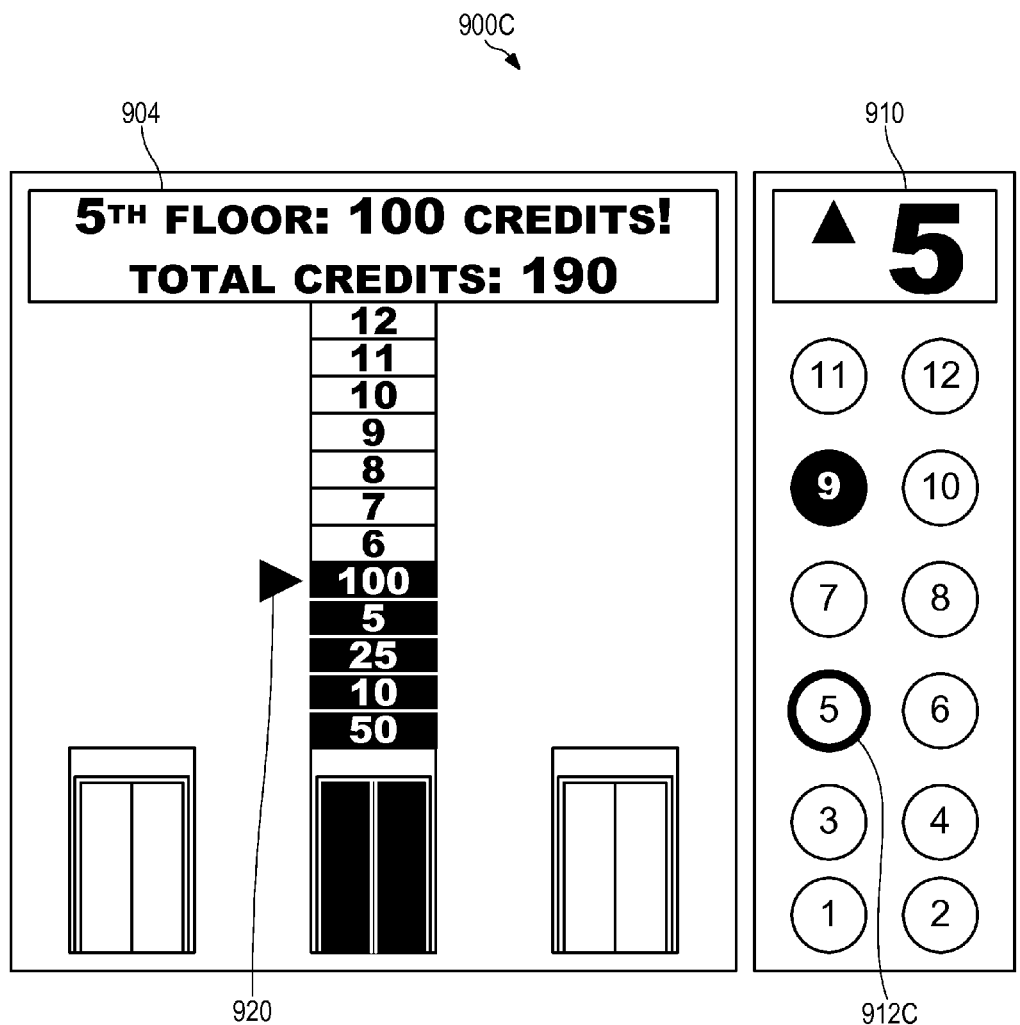
Figure 9D:
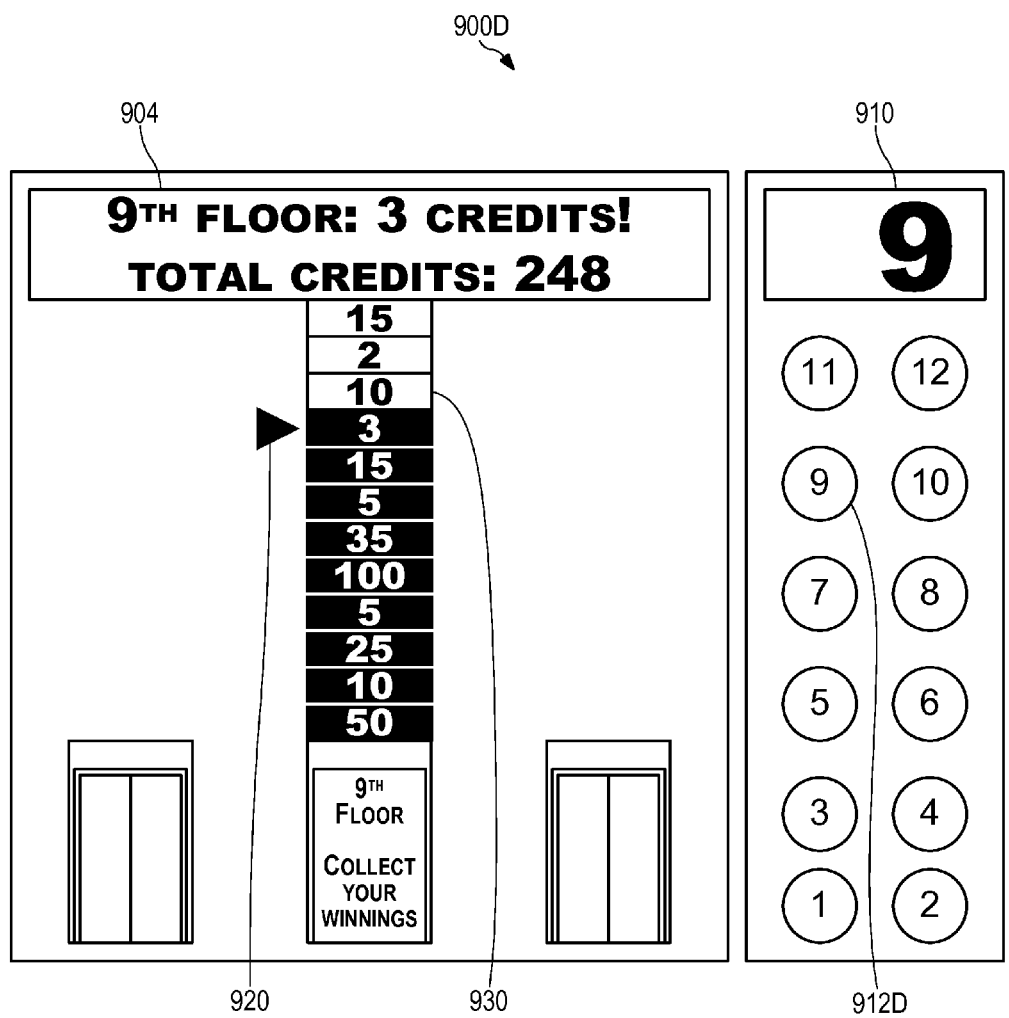
Figure 9E:
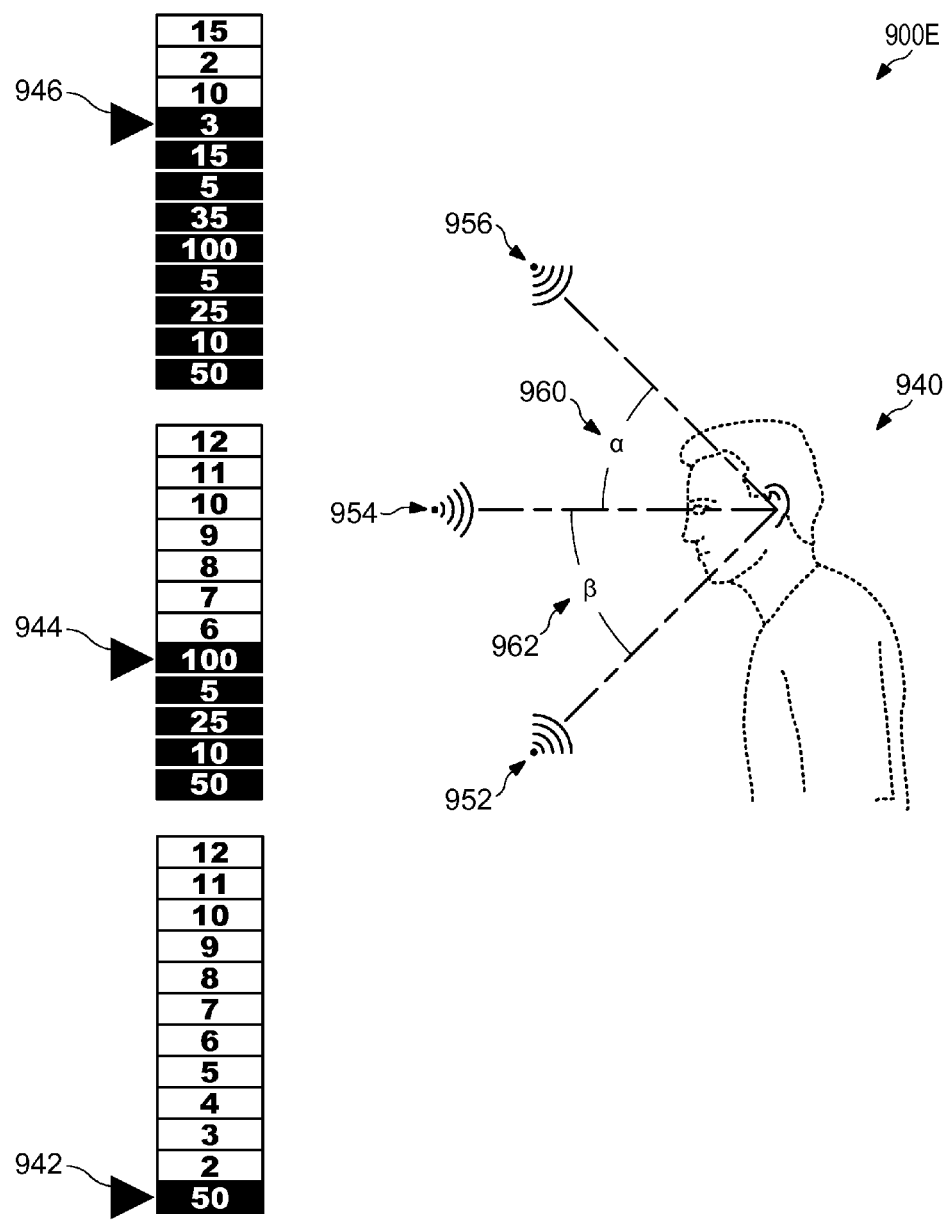

In FIG. 9C, the game play has moved to the fifth floor and the player has collected a total of 190 credits (e.g., 50+10+ 25+5+100=190). In FIG. 9D, the game play has moved to the ninth floor and the player has collected a total of 248 credits (e.g., 50+10+25+5+100+35+5+15+3=248). In FIG. 9E, a player 940 may receive one or more sound waves from a first direction 952, a second direction 954, and a third direction 956. In this example, when the elevator was on first floor 922 one or more sound waves came from first direction 952 at a first angle 962. Further, when the elevator was on the fifth floor one or more sound waves came from second direction 954. In addition, when the elevator was on the ninth floor one or more sound waves came from a third direction 956 at a second angle 960. In this example, the one or more sound waves are moving along a Y-Axis. However, it should be noted that the sound waves may move along the Y-Axis and the X-Axis. For example, an image of a rocket moving from the lower left corner of the screen to the upper right corner of the screen may involve sound moving in both the Y-Axis and the X-Axis.

Figure 10:
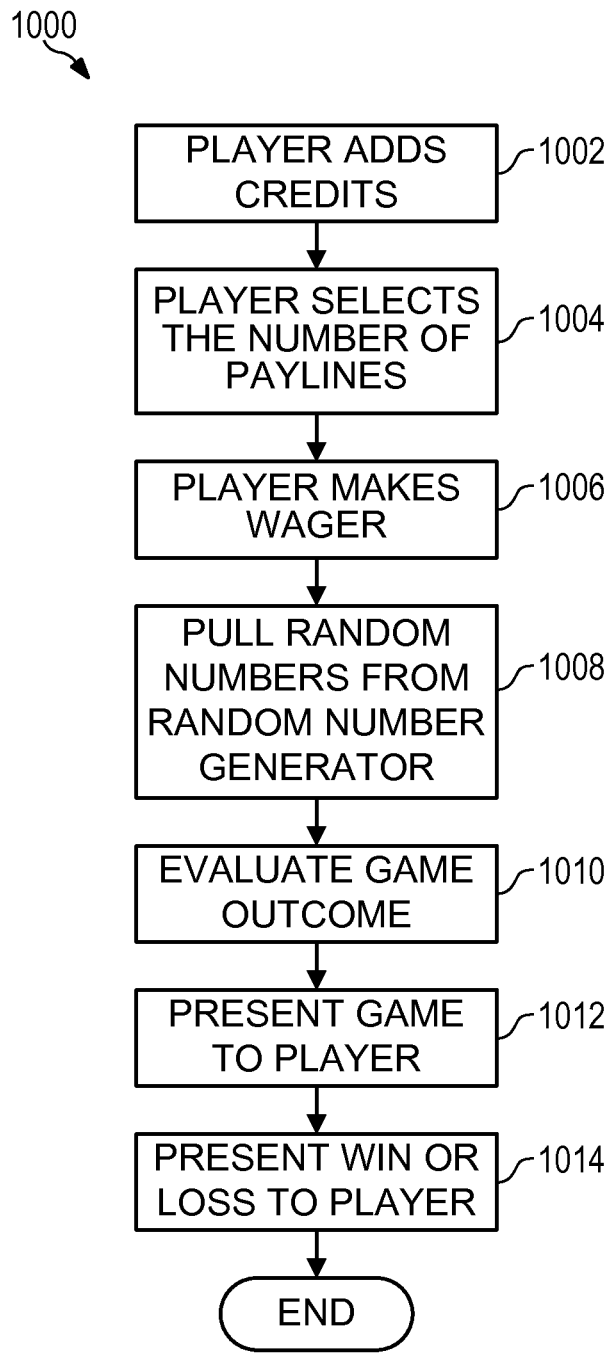
FIG. 10 shows a game play flow diagram, according to one embodiment.

FIG. 10 is a process flowchart of one example of a primary game play 1000 on an electronic gaming system, according to one embodiment. The method may include the step of a player adding credit to the electronic gaming system (step 1002). It is contemplated that a player can do this by inserting cash, coins, a ticket representative of a cash value, a credit card, a player card, requesting an electronic funds transfer ("EFT"), otherwise requesting access to an account having monetary funds, and/or any combination thereof.

At step 1004, the player selects the number of paylines to play. In one embodiment, the player can select from a plurality of different paylines to play. In a further embodiment, the player can only play a predetermined number of paylines. An example of this embodiment may be the instance where the gaming system only allows a player to play forty paylines, and cannot select to play more or less paylines. In another embodiment, the gaming system does not offer paylines, but rather offers a different way to evaluate the game play. One example of a different way may be sometimes referred to as a 243-ways evaluation, where symbols may be evaluated based on the existence of like-symbol clusters on adjacent reels, starting with the left-most reel and continuing right, instead of how many paylines run through the like-symbol clusters.

At step 1006, the player makes a wager on the game. In one embodiment, the wager may be a multiple of the number of paylines selected at step 1004. In another embodiment, the wager may not be a multiple of the number of paylines selected at step 1004. In a further embodiment, the wager may include a side-wager (e.g., ante bet), which may, in one example of such an embodiment, be used to make the player eligible to be awarded the extra functionality discussed above. It should be appreciated that in some embodiments, the order of steps 1004 and 1006 may be not critical, and so for example, a player can select the wager they wish to place, and then select the number of paylines they want it applied to, and that these embodiments are expressly contemplated as being within the scope of the present disclosure.

Continuing to step 1008, the gaming system pulls random numbers from a random number generator ("RNG"). In one embodiment, the system pulls one random number for each reel. In another embodiment, the system pulls one random number which may be utilized to determine the stop positions for each reel. In another embodiment, the random numbers determined by the RNG may be based on the time that the numbers may be pulled. In another embodiment, the random numbers determined by the RNG may be based on the prior numbers pulled.

At steps 1010 and 1012, the gaming system utilizes the random numbers pulled at step 1008 to determine the primary game symbols to display in the play of the primary game, which in turn both determines the presentation of the game to the player and evaluates the game outcome. In one embodiment, the random numbers pulled determine the stopping positions for the reels, which may be then caused to stop at those associated positions, and then the gaming system evaluates the displayed primary game symbols to determine the game outcome. In another embodiment, the gaming system determines the game outcome based on the pulled random numbers, and then causes the game to present an associated outcome to the player.

At step 1014, the win or loss outcome may be identified for the player. In one embodiment, this step can include additional messaging, which provides information related to the win or loss, such as why the player won or lost. In another embodiment, this step can include identification of the amount of any award earned by the player.

Figure 11:
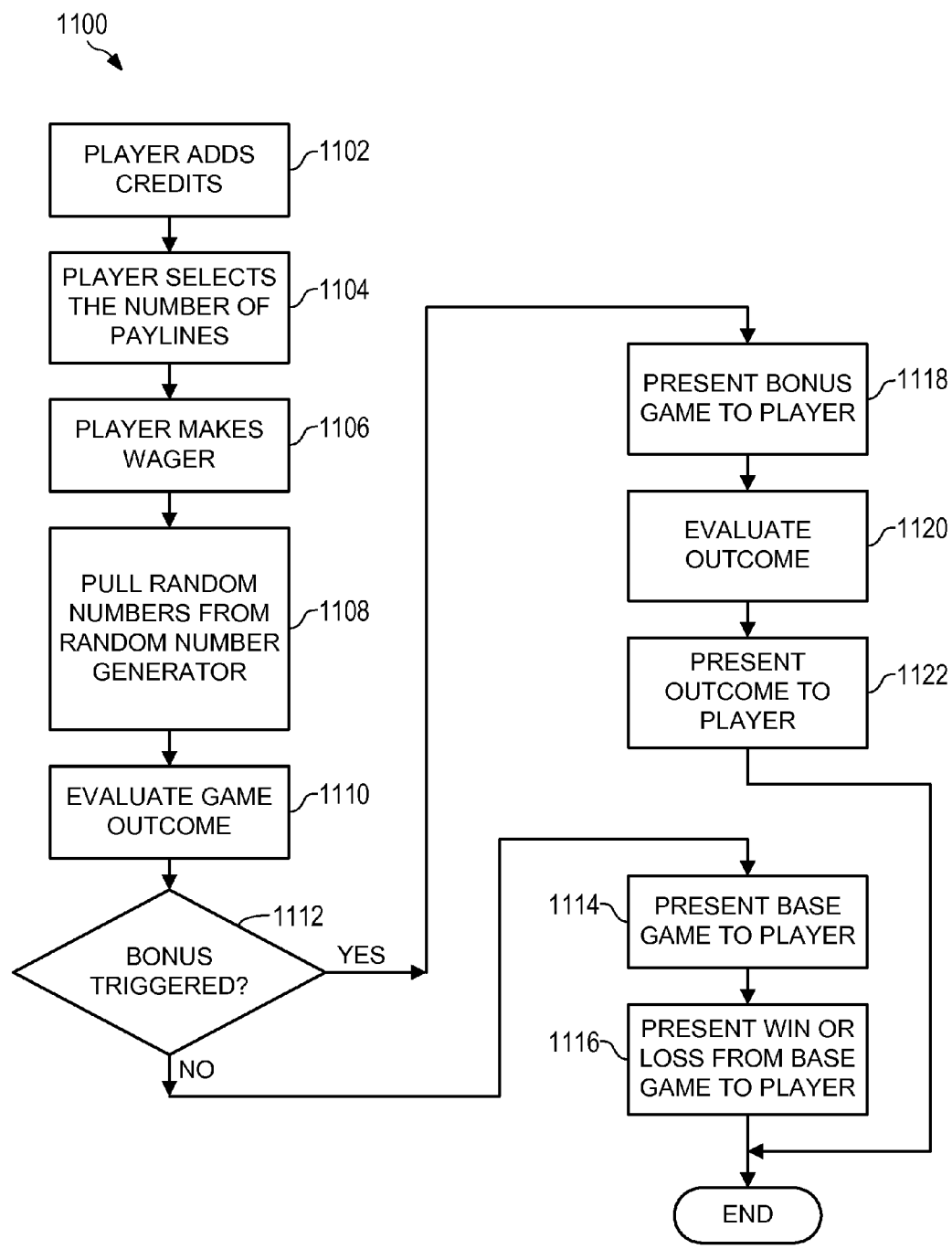
FIG. 11 is a flow diagram for game play, according to one embodiment.

FIG. 11 is a process flowchart of one example of a combined primary and secondary game play 1100 on an electronic gaming system, according to one embodiment. The method may include the step of a player adding credit to the electronic gaming system (step 1102). It is contemplated that a player can do this by inserting cash, coins, a ticket representative of a cash value, a credit card, a player card, requesting an electronic funds transfer ("EFT"), otherwise requesting access to an account having monetary funds, and/or any combination thereof.

At step 1104, the player selects the number of paylines to play. In one embodiment, the player can select from a plurality of different paylines to play. In a further embodiment, the player can only play a predetermined number of paylines. An example of this embodiment may be the instance where the gaming system only allows a player to play forty paylines, and cannot select to play more or less paylines. In another embodiment, the gaming system does not offer paylines, but rather offers a different way to evaluate the game play. One example of a different way may be sometimes referred to as a 243-ways evaluation, where symbols may be evaluated based on the existence of like-symbol clusters on adjacent reels, starting with the left-most reel and continuing right, instead of how many paylines run through the like-symbol clusters.

At step 1106, the player makes a wager on the game. In one embodiment, the wager may be a multiple of the number of paylines selected at step 1104. In another embodiment, the wager may not be a multiple of the number of paylines selected at step 1104. In a further embodiment, the wager may include a side-wager, which may, in one example of such an embodiment, be used to make the player eligible to be awarded the extra functionality discussed above. It should be appreciated that in some embodiments, the order of steps 1104 and 1106 may be not critical, and so for example, a player can select the wager they wish to place, and then select the number of paylines they want it applied to, and that these embodiments may be expressly contemplated as being within the scope of the present disclosure.

Continuing to step 1108, the gaming system pulls random numbers from a random number generator "RNG". In one embodiment, the system pulls one random number for each reel. In another embodiment, the system pulls one random number which may be utilized to determine the stop positions for each reel. In another embodiment, the random numbers determined by the RNG may be based on the time that the numbers may be pulled. In another embodiment, the random numbers determined by the RNG may be based on the prior numbers pulled.

At step 1110, the gaming system utilizes the random numbers pulled at step 1108 to evaluate the game outcome. In one embodiment, the random numbers pulled determine the stopping positions for the reels, which may be then caused to stop at those associated positions, and then the gaming system evaluates the displayed primary game symbols to determine the game outcome. In another embodiment, the gaming system determines the game outcome based on the pulled random numbers, and then causes the game to present an associated outcome to the player.

At step 1112, the gaming system determines if a secondary or bonus game may be triggered. In one embodiment, the bonus game is triggered by the display of a plurality of matching symbols at a plurality of predetermined symbol positions within a play of the primary game. In one example, the bonus game may be triggered if a plurality of matching symbols is displayed on the $2^{nd}$, $3^{rd}$ and $4^{th}$ reel. In another example, the bonus game may be triggered if matching symbols are displayed on the $1^{st}$, $2^{nd}$ and $3^{rd}$ reels. In a further example, the bonus game may be triggered if matching symbols occur at predetermined symbol positions that include consecutive and non-consecutive reels. In another example, a bonus game (e.g., secondary game) may be triggered in any way (e.g., one special symbols in any locations, one special symbol in one or more predetermined locations, two special symbols in any locations, two special symbols in one or more predetermined locations, three special symbols in any locations, three special symbols in one or more predetermined locations, etc.).

If it is determined that a bonus or secondary game was not triggered, the process continues to step 1114, where the base game may be fully presented to the player. As discussed above, the orders of step 1110, 1112, and 1114 can be changed without affecting the novel concepts disclosed herein.

At step 1116, the win or loss outcome of the primary game may be identified for the player. In one embodiment, this step can include additional messaging, which provides information related to the win or loss, such as why the player won or lost. In another embodiment, this step can include identification of the amount of any award earned by the player If it is determined at step 1112 that a bonus or secondary game was triggered, then process 1100 continues to step 1118, where the secondary game may be presented to the player. As discussed above, there are numerous ways to present the secondary or bonus game to the player.

At steps 1120 and 1122, the outcome of the secondary game may be evaluated and presented to the player. In one embodiment, the outcome of the bonus game will always be a winning outcome. In another embodiment, the outcome of the secondary game will cause a significant award to be provided to the player. In one example of such an embodiment, the award may not be provided by the gaming system, as a casino operator may need to verify tax information before allowing such an award to be provided to the player.

In one embodiment, instead of the process 1100 ending after step 1122, the process continues to step 1114 so as to finalize the primary game outcome presentation to the player.

Figure 12:
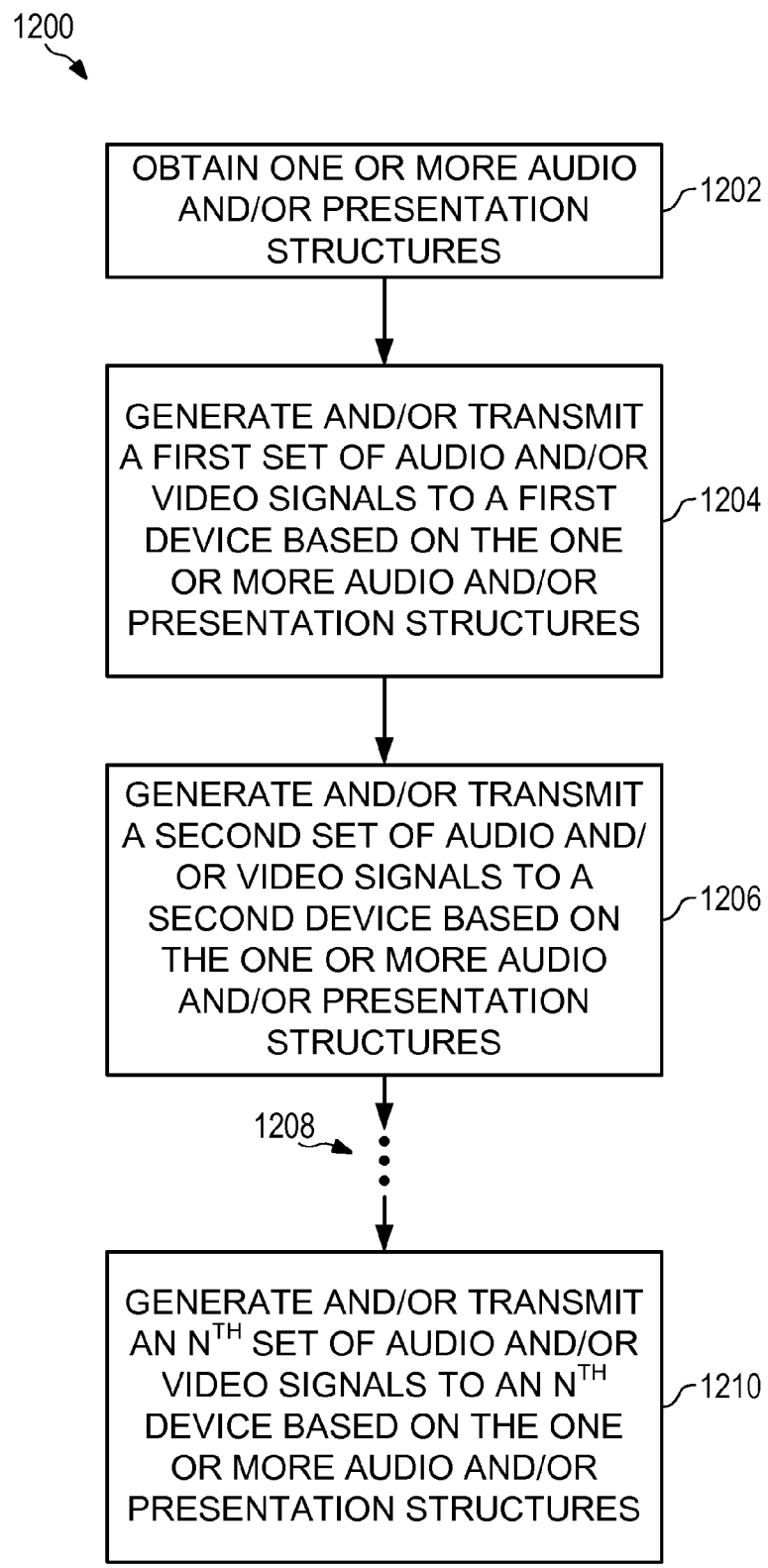
FIG. 12 is a flow diagram for game play, according to one embodiment.

In FIG. 12, a flow diagram for game play 1200 is shown, according to one embodiment. The method may include obtaining one or more audio structures and/or one or more presentation structures (step 1202). The method may include generating and/or transmitting a first set of audio and/or video signals to a first device based on the one or more audio and/or presentation structures (step 1204). The method may include generating and/or transmitting a second set of audio and/or video signals to a second device based on the one or more audio and/or presentation structures (step 1206). The method may repeat this structure one or more times (step 1208). The method may include generating and/or transmitting an nth set of audio and/or video signals to an Nth device based on the one or more audio and/or presentation structures (step 1210).

Figure 13:
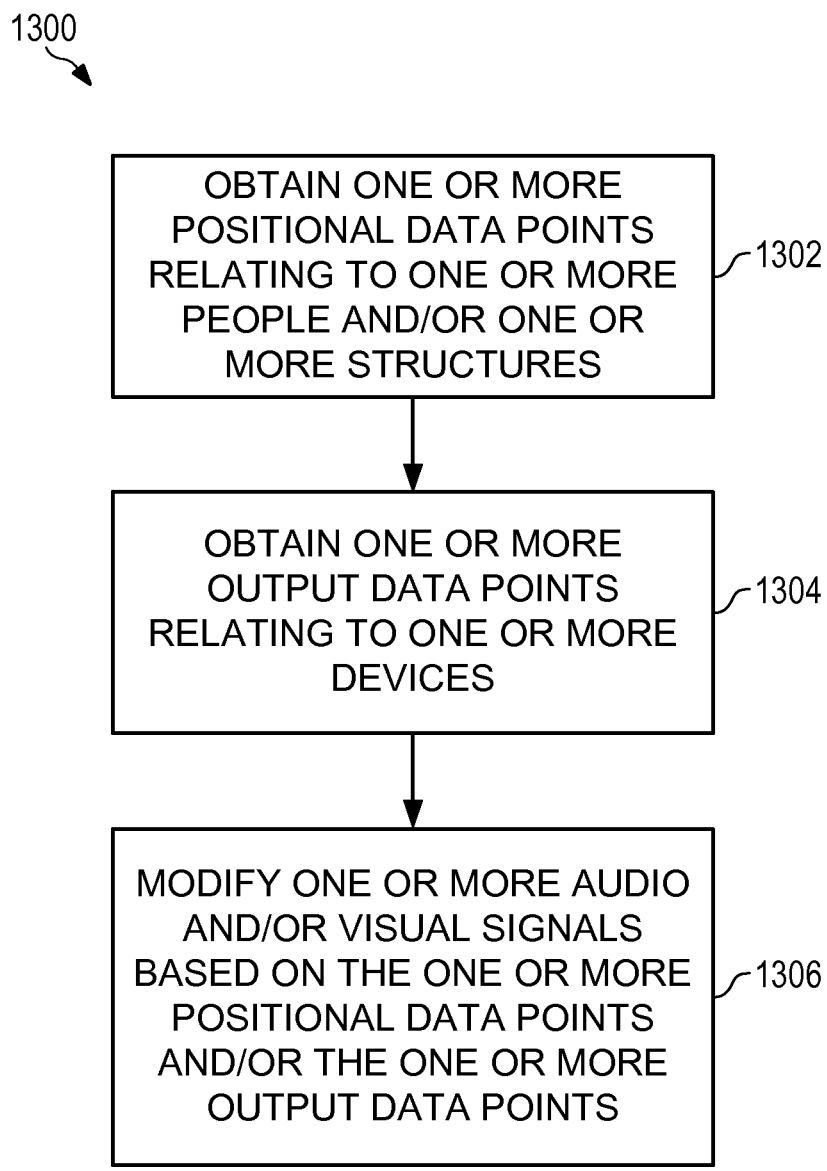
FIG. 13 is a flow diagram for game play, according to one embodiment.

In FIG. 13, a flow diagram for game play 1300 is shown, according to one embodiment. The method may include obtaining one or more positional data points relating to one or more people and/or one or more structures (step 1302). The method may include obtaining one or more output data points relating to one or more devices (step 1304). The method may include modifying one or more audio and/or visual signals based on the one or more positional data points and/or one or more output data points (step 1306). For example, a feedback signal may indicate that one or more devices is out of tolerance. Therefore, one or more device characteristics may be modified to correct for this out of tolerance state. In another example, a player position and/or size may require a modification of one or more device characteristics and/or positions to optimize the sound quality.

Figure 14:
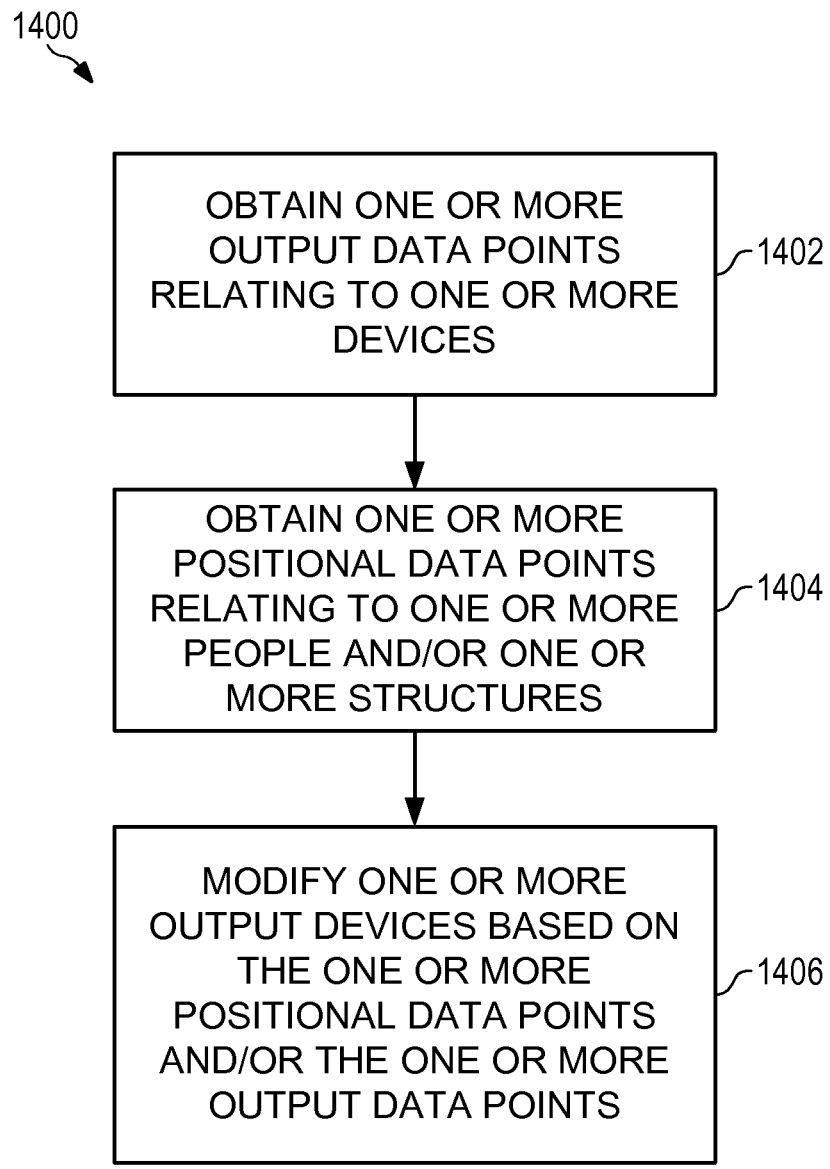
FIG. 14 is a flow diagram for game play, according to one embodiment.

In FIG. 14, a flow diagram for game play 1400 is shown, according to one embodiment. The method may include obtaining one or more output data points relating to one or more devices (step 1402). The method may include obtaining one or more positional data points relating to one or more people and/or one or more structures (step 1404). The method may include modifying one or more output devices based on the one or more positional data points and/or the one or more output data points (step 1406). For example, a structure may be placed in the way of one or more sound waves, therefore, one or more adjustments (e.g., physical, device characteristics, etc.) may be made to correct for this structure.

Figure 15:
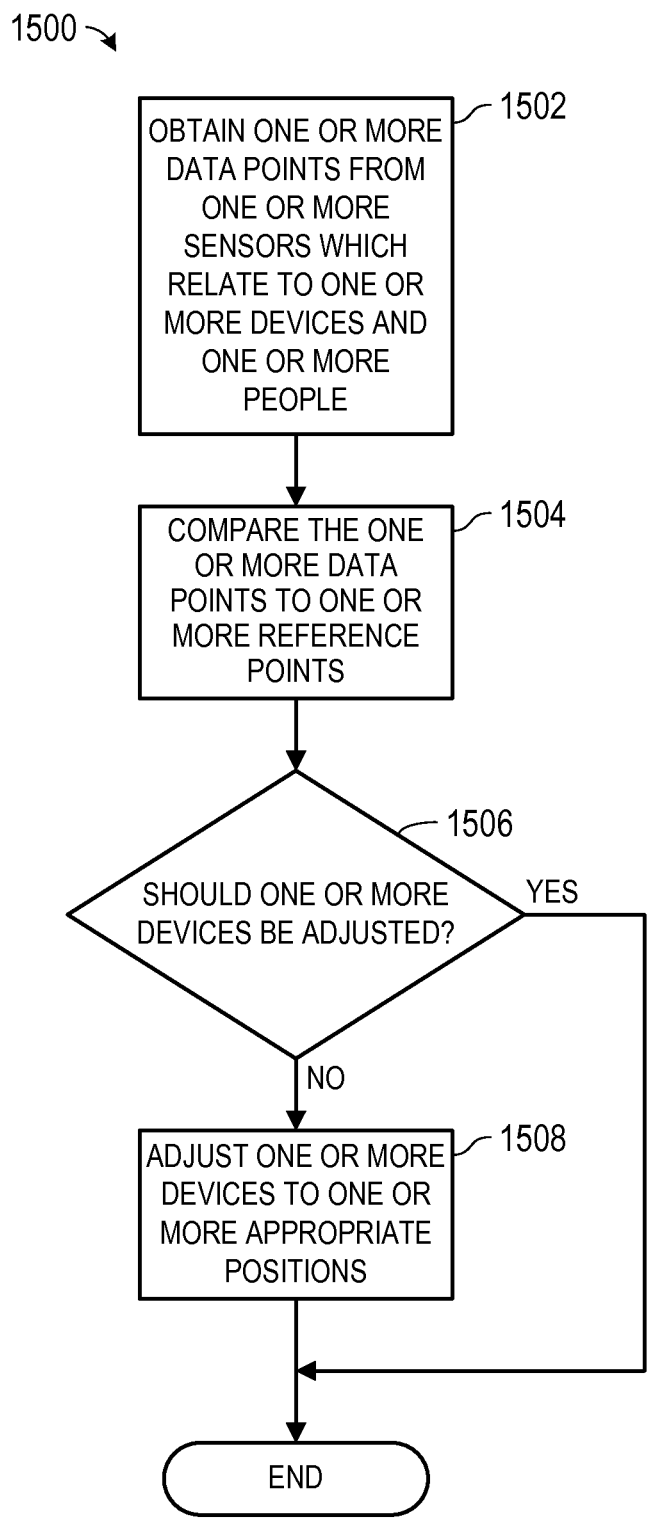
FIG. 15 is a flow diagram for adjusting one or more sound devices, according to one embodiment.

In FIG. 15, a flow diagram for adjusting one or more sound devices 1500 is shown, according to one embodiment. The method may include obtaining one or more data points from one or more sensors which relates to one or more devices and/or one or more people (step 1502). The method may include comparing the one or more data points to one or more reference points (step 1504). The method may include that electronic gaming device 100 and/or electronic gaming system 200 may determine whether the one or more devices should be adjusted (step 1506). If the one or more devices should not be adjusted, then the method may end. If the one or more devices should be adjusted, then the method may include adjusting the one or more devices to one or more appropriate positions (step 1508).

Figure 16:
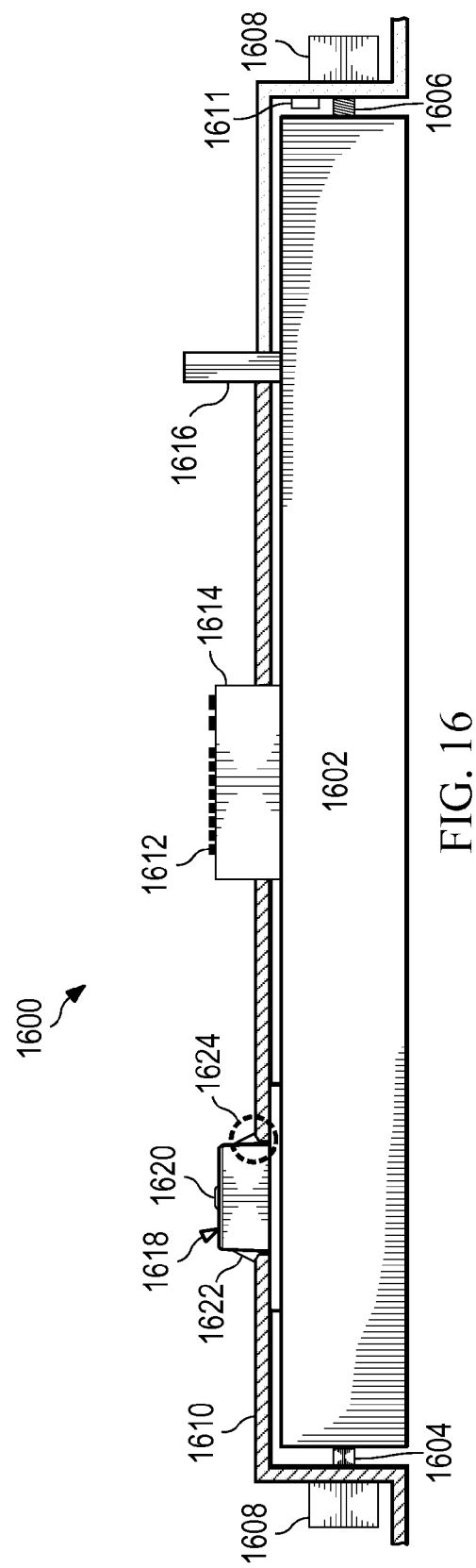
FIG. 16 is an illustration of one or more adjustable devices utilized with one or more audio devices and/or one or more visual devices, according to one embodiment.

In FIG. 16, one or more adjustable devices utilized with one or more audio devices and/or one or more visual devices 1600 is shown, according to one embodiment. In one example, the system may include: an audio device 1602; a first adjustable device 1604; a spring 1606; one or more motors 1608; a support structure 1610; one or more sensors 1611; one or more electrical connections 1614 with one or more electronic connectors 1612; a first physical connection 1616; and a second physical connection 1618 with a release tab 1620 and a first connection device 1622 and a second connection device 1624.

In one example, audio interface locked area 1610 shows that front-mounted locking device has passed over (through) display interface, which compressed (e.g., puts in an open position) front-mounted locking device. Once front-mounted locking device went through audio interface, then front-mounted locking device opened up (e.g., put in a closed position) to securely attach front-mounted locking device to audio interface which can be seen in locking area.

One or more electrical interconnection points 1614 may be a combination of one or more electrical attachment points and one or more electrical attachment devices. One or more electrical wires 1612 may be any items which can carry electrical energy and/or data.

One or more springs 1606 may be utilized to manually and/or automatically (e.g., via one or more motors 1608) adjust one or more audio devices 1602 on the electronic gaming device 100, to a predetermined position, to a floating position, and/or any combination thereof. The flush position may allow one or more audio devices 1602 to appear level with the outside of electronic gaming device 100, which gives a high-tech feel to electronic gaming device 100. The predetermined position may be any position (e.g., flush, floating, within one-half of an inch from a flush position with electronic gaming device 100). The floating position may allow for reduced breakage of one or more audio devices 1602 when a force is applied to any part of electronic gaming device 100. The positions of one or more audio devices 1602 may be adjusted based on a mode of operation. For example, during installation and repair the floating position may be utilized to minimize breakage of one or more audio devices 1602. In another example, during a cleaning operation a first predetermined position may be utilized to have one or more audio devices 1602 be outside of electronic gaming device 100 to clean the sides of one or more audio devices 1602 and then a second predetermined position may be utilized to have one or more audio devices 1602 be inside of electronic gaming device 100 to clean the perimeter of display installation area. In another example, during game play the flush position may be utilized to give electronic gaming device 100 a high-tech feel that a player may enjoy. Any of the positions may be adjusted and/or maintained via data feedback from one or more sensors 1611.

One or more adjustable devices 1604 may be utilized in conjunction with and/or replace one or more springs 1606. One or more adjustable devices 1604 and/or one or more springs 1606 may be in any position (e.g., one or more audio devices 1602, first audio device, wall of the audio installation area, back of the audio installation area, one or more audio interfaces, one or more electrical attachment points 1612, input area, one or more input devices, second audio device, etc.).

One or more sensors 1611 may obtain and/or transmit one or more data points (e.g., positional data, temperature data, etc.) relating to one or more audio devices 1602, audio interface area, audio support area, audio locking device, one or more electrical attachment devices, one or more attachment areas, electronic gaming device 100, electronic gaming system 200, first audio device, wall of the audio installation area, back of the audio installation area, one or more audio interfaces, one or more electrical attachment points, an input area, one or more input devices, second audio device, front-mounted audio device, audio interface locked area, one or more electrical interconnection points, one or more electrical wires, one or more springs, one or more motors, one or more adjustable devices, and/or one or more sensors to one or more processors.

One or more sensors may obtain and/or transmit one or more data points (e.g., positional data, temperature data, etc.) relating to one or more audio devices, one or more electrical wires, one or more springs, one or more motors, one or more adjustable devices, and/or one or more sensors to one or more processors.

In one embodiment, the electronic gaming device may include a plurality of reels. The one or more paylines may be formed on at least a portion of the plurality of reels. The electronic gaming device may include a memory.

In one embodiment, the electronic gaming device includes one or more processors, a memory, and one or more display devices. The electronic gaming device may include: a left surround audio device; a right surround audio device; a dialog enhancing center channel speaker; a low frequency effects device; a left speaker; and/or a right speaker. The combination of the left surround audio device, the right surround audio device, the dialog enhancing center channel speaker, the low frequency effects device, the left speaker, and the right speaker may produce one or more sound effects in a vertical direction.

In another example, the left surround audio device, the right surround audio device, the dialog enhancing center channel speaker, the low frequency effects device, the left speaker, and the right speaker may produce one or more sound effects in a diagonal direction.

In another example, the left surround audio device and the right surround audio device may be located at a top of the electronic gaming device. In another example, the left surround audio device and the right surround audio device may be located at a top of a first display. In one example, the dialog enhancing center channel speaker may be located at least partially between a first display and a second display. In another example, the left speaker and the right speaker may be located at a lower end of the second display. In one example, the electronic gaming device may further include one or more sensors. In another example, the electronic gaming device may further include one or more adjustable devices. In an example, the one or more adjustable devices may move at least one of an audio device and a display device based on data from the one or more sensors. In another example, the one or more adjustable devices may move at least one of an audio device and a display device based on player preference data.

In another embodiment, the electronic gaming system includes a server and one or more display devices. The server includes a server memory and a server processor. The electronic gaming system may include: a left surround audio device; a right surround audio device; a dialog enhancing center channel speaker; a low frequency effects device; a left speaker; and/or a right speaker. The combination of the left surround audio device, the right surround audio device, the dialog enhancing center channel speaker, the low frequency effects device, the left speaker, and/or the right speaker may produce one or more sound effects in a vertical direction.

In another example, the left surround audio device, the right surround audio device, the dialog enhancing center channel speaker, the low frequency effects device, the left speaker, and the right speaker may produce one or more sound effects in a diagonal direction.

In another example, the left surround audio device and the right surround audio device may be located at a top of the electronic gaming device.

In another example, the left surround audio device and the right surround audio device may be located at a top of a first display. In one example, the dialog enhancing center channel speaker may be located at least partially between a first display and a second display. In another example, the left speaker and the right speaker may be located at a lower end of the second display. In one example, the electronic gaming device may further include one or more sensors. In another example, the electronic gaming device may further include one or more adjustable devices. In an example, the one or more adjustable devices may move at least one of an audio device and a display device based on data from the one or more sensors. In another example, the one or more adjustable devices may move at least one of an audio device and a display device based on player preference data.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming device comprising:
one or more processors;
a memory;
one or more display devices;
a plurality of audio generating devices comprising:
 a left surround audio device;
 a right surround audio device;
 a dialog enhancing center channel speaker;
 a low frequency effects device;
 a left speaker; and
 a right speaker; and
at least one adjustment device configured to change a position of at least one of the audio generating devices;
wherein the one or more processors are configured to control the plurality of audio generating devices and the at least one adjustment device to produce one or more sound effects having a perceived sound source which changes locations.

2. The electronic gaming device of claim 1, wherein the one or more processors change the perceived sound source corresponding to information displayed on at least one video display of the electronic gaming device.

3. The electronic gaming device of claim 1, wherein the left surround audio device and the right surround audio device are located at a top of the electronic gaming device.

4. The electronic gaming device of claim 1, wherein the left surround audio device and the right surround audio device are located at a top of a first display disposed on a front side of the electronic gaming device.

5. The electronic gaming device of claim 4, wherein the dialog enhancing center channel speaker is located at least partially between a first display and a second display disposed on the front side of the electronic gaming device, the second display being disposed below the first display.

6. The electronic gaming device of claim 5, wherein the left speaker and the right speaker are located at a lower end of the second display.

7. The electronic gaming device of claim 1, further including one or more sensors which are configured to sense at least one object located adjacent to the electronic gaming device.

8. The electronic gaming device of claim 7, wherein the one or more processors are configured to control the at least one adjustable device based upon an output from the one or more sensors.

9. The electronic gaming device of claim 8, wherein the one or more processors are configured to control the at least one adjustable device based upon an output from the one or more sensors in comparison to at least one reference point.

10. The electronic gaming device of claim 1, wherein the at least one adjustable device comprises at least one motor.

11. An electronic gaming system comprising:
a server including a server memory and a server processor;
one or more display devices;
a plurality of audio generating devices comprising:
 a left surround audio device;
 a right surround audio device;
 a dialog enhancing center channel speaker;

a low frequency effects device;
a left speaker; and
a right speaker;
and
at least one adjustment device configured to change a position of at least one of the audio generating devices;
wherein the server processors is configured to control the plurality of audio generating devices and the at least one adjustment device to produce one or more sound effects having a perceived sound source which changes locations.

12. The electronic gaming system of claim 11, wherein the server processor changes the perceived sound source corresponding to information displayed on at least one video display.

13. The electronic gaming system of claim 11, wherein the left surround audio device and the right surround audio device are located at a top of the electronic gaming system.

14. The electronic gaming system of claim 11, wherein the left surround audio device and the right surround audio device are located at a top of a first display disposed on a front side of the electronic gaming device.

15. The electronic gaming system of claim 14, wherein the dialog enhancing center channel speaker is located at least partially between a first display and a second display disposed on the front side of the electronic gaming device, the second display being disposed below the first display.

16. The electronic gaming system of claim 15, wherein the left speaker and the right speaker are located at a lower end of the second display.

17. The electronic gaming system of claim 11, further including one or more sensors which are configured to sense at least one object located adjacent to the audio generating devices.

18. The electronic gaming system of claim 17, wherein the server processor are configured to control the at least one adjustable device based upon an output from the one or more sensors.

19. The electronic gaming system of claim 18, wherein the server processor are configured to control the at least one adjustable device based upon an output from the one or more sensors in comparison to at least one reference point.

20. The electronic gaming system of claim 11, wherein the at least one adjustable device comprises at least one motor.

* * * * *